(12) United States Patent
Kondoh et al.

(10) Patent No.: US 6,707,514 B2
(45) Date of Patent: Mar. 16, 2004

(54) OPTICAL PATH ELEMENT, OPTICAL SWITCHING ELEMENT, SPATIAL LIGHT MODULATOR AND IMAGE DISPLAY APPARATUS

(75) Inventors: Hitoshi Kondoh, Sagamihara (JP); Hidenori Tomono, Yokohama (JP); Ikue Kawashima, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/098,414

(22) Filed: Mar. 18, 2002

(65) Prior Publication Data

US 2003/0016905 A1 Jan. 23, 2003

(30) Foreign Application Priority Data

Mar. 21, 2001 (JP) ......................................... 2001-081267
Jun. 21, 2001 (JP) ......................................... 2001-187577

(51) Int. Cl.[7] ........................................... G02F 1/1335
(52) U.S. Cl. .............................. 349/62; 349/64; 349/8; 385/16; 385/24; 359/634
(58) Field of Search ........................... 349/5, 8, 10, 62, 349/64; 385/1, 4, 11, 16, 24; 359/634, 629

(56) References Cited

U.S. PATENT DOCUMENTS 5,587,816 A * 12/1996 Gunjima et al. .............. 349/62

* cited by examiner

Primary Examiner—Phan T. H. Palmer
(74) Attorney, Agent, or Firm—Dickstein Shapiro Morin & Oshinsky LLP

(57) ABSTRACT

An optical switching element, comprising a light transmitting element, a reflection substrate, and index variable material. The light transmitting element has a first light incident surface, a second light incident surface not parallel to the first light incident surface, and a light outgoing surface. The reflection substrate is arranged opposite to the second light incident surface and has a reflection surface with an angle that is not parallel to the second light incident surface, wherein a reflected light passes through the light transmitting element and the reflection substrate and then is reflected by the reflection surface. The index variable material is sandwiched between the light transmitting element and the reflection substrate and has an index of refraction varied according to an external signal. By varying the index of refraction of the index variable material, an angle formed by the reflected light and a normal line of the light outgoing surface is changed such that the emitting direction of the reflected light is changed.

15 Claims, 35 Drawing Sheets

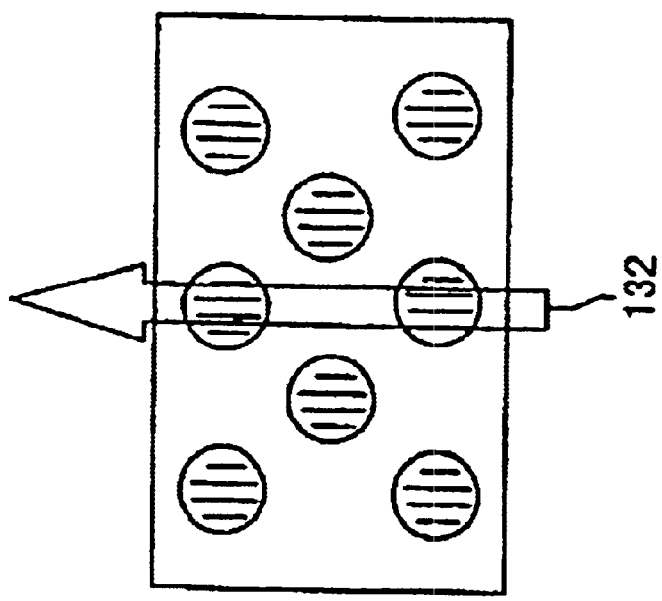
FIG. 11B
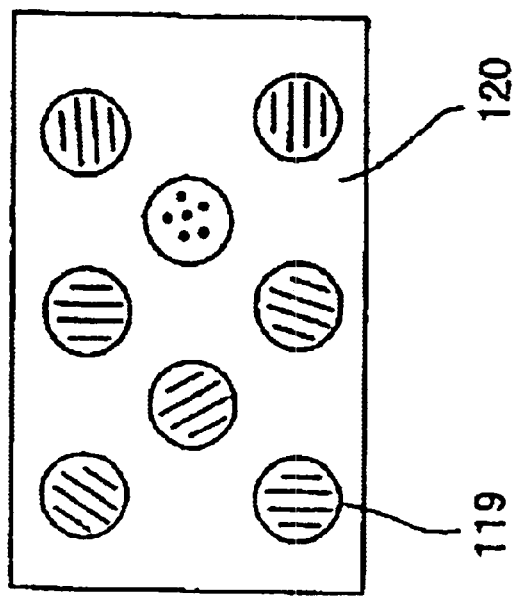
FIG. 11A
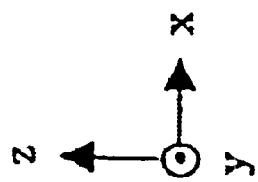

OPTICAL PATH ELEMENT, OPTICAL SWITCHING ELEMENT, SPATIAL LIGHT MODULATOR AND IMAGE DISPLAY APPARATUS

CROSS-REFERENCE TO RELATED APPLICATION

This application claims the priority benefit of Japanese application serial no. 2001-081267, filed on Mar. 21, 2001 and 2001-187577, filed on Jun. 21, 2001.

BACKGROUND OF THE INVENTION

1. Field of the Invention

This invention relates in general to an optical path element, an optical switching element, a spatial light modulator and an image display apparatus. More specifically, the invention relates to an optical path element, an optical switching element and a spatial light modulator, and an image display apparatus using the above, by which simpler structure, superior durability, low device cost, and high utilization rate for light can be achieved.

2. Description of Related Art

An optical switching device is used for switching the light by changing the reflection direction of an incident light. For example, Japanese Laid Open H05-196880 discloses an optical switching device and a spatial light modulator using the optical switching device, in which a plurality of tiny rotational mirrors are arranged in a two dimensional array.

FIG. 19 shows a plane view of a conventional spatial light modulator disclosed in Japanese Laid Open H05-196880. As shown, only a torsion beam reflection surface 11 and a beam supporting post 12 are observed. FIGS. 20A and 20B show a cross-sectional view of one of rotational mirrors of the spatial light modulator in FIG. 19. FIG. 20A is a cross-sectional view along a hinge and FIG. 20B is a cross-sectional view perpendicular to FIG. 20A. The beam 11 can be rotated around a ground electrode 14 by the beam supporting post 12 due to the twist of the hinge 13 connected to the post 15. The driving force is given by applying a voltage to an address electrode 17 supported by the post 16. The voltage applied to the address electrode 17 is by transmitting a signal through a metal layer 18, in which the signal is from a CMOS circuit (not shown) formed on a substrate 19. The rotational status of the beam 11 varies for each rotational mirror so that the incident light can be spatially modulated in a two-dimensional manner.

According to the above structure, in order to obtain a large rotational angle, the structure of the rotational mirror becomes very complicated and the manufacturing cost increases.

Japanese Laid Open H11-202222 discloses another exemplary optical switching device, the operation of which is explained in FIG. 21. The optical switching device comprises a light transmission part 21 provided with a full reflecting plane 22 for fully reflecting light and transmitting it, a prism 31 capable of capturing, reflecting and emitting evanescent light while an extracting plane 32 is near the full reflecting plane 22, and a driving part 40 for driving the prism 31, which are all laminated in this order in the light emitting direction. The cell at the right side shown in FIG. 21 activates the driving part 40 such that the prism 31 moves to a position above the extraction distance where the evanescent light would leak. At this time, as shown in FIG. 21, the light 1 transporting in the light transmitting element 21 is totally reflected at the total reflection surface 22 and then the reflected light 2 emits rightwards. When the driving part is deactivated, as in the cell at the left side shown in FIG. 21, because the prism 31 is near to a position under the extraction distance where the evanescent light would leak, the light I transporting in the light transmitting element 21 is not reflected at the total reflection surface 22 but enters the prism 31. The light that enters the prism 31 is then reflected at the reflection surface 31a of the prism 31 and then passes through the light transmitting element 21 to emit as the light 3 shown in FIG. 21.

According to the above method, the extracted and the unextracted states of the evanescent light can be switched. This structure is suitable for a tiny displacement about the wavelength of the light, and a simple driving mechanism can be used. However, because the mechanism of the prism 31 in FIG. 21 is a very complicated structure, it is very difficult to form a plurality of tiny-size prisms on the substrate uniformly, causing problems such as low yield rate and high cost etc. Additionally, as the prism 31 approaches the total reflection surface 22 of the light transmitting element 21, the Van der Walls force or the liquid bridging force occurs between them, and therefore it is very hard to separate the prism 31 from the total reflection surface 22.

Japanese Laid Open 2000-171813 discloses another exemplary optical switching device, which is shown in FIG. 22. A light transmitting element for transmitting light by the total reflection is provided such that the alignment of a liquid crystal can be controlled by applying a voltage to the liquid crystal 60 that is in contact with the light transmitting element 50. Therefore, the effective index of refraction can be varied with respect to an ordinary light and an extraordinary light. The switching mechanism can be made between the first state, where the incident light (linear polarized) 1 is emitted as a total reflection light 2, and the second state, where the penetrated light of the incident light is reflected by a reflection film 61 to change its direction and then is emitted as a reflection light 3. In FIG. 22, the light switching device further comprises a transparent electrode 51, a driving IC for the liquid crystal 70 and electrode terminals 71.

As described above, because there are no mechanical driving parts, the foregoing problems do not happen. However, because of the total reflection at the interface of the light transmitting element and the liquid crystal, it needs a material with a high index of refraction to make the light transmitting element, or a large incident angle is required, thereby the material cost becomes very high and the optical system is very complicated. Accordingly, it is not suitable for application in practice, because, for example, the light utilization rate is lowered.

SUMMARY OF THE INVENTION

To solve the aforementioned problems, the invention provides an optical path element, an optical switching element and a spatial light modulator, and an image display apparatus using the above, by which simpler structure, superior durability, low device cost, and high utilization rate for light can be achieved.

Therefore, it is an object of the invention to provide an optical switching element, which can be easily made at low cost.

It is another object of the invention to provide an optical switching element, which has a high S/N ratio and a small driving energy.

It is still another object of the invention to provide an optical switching element, which has a fast response time and a low light loss.

It is still another object of the invention to provide a spatial light modulator, of which the structure can be simplified, the durability is high, the cost can be reduced, and the light utilization rate can be increased.

It is still another object of the invention to provide a low-cost image display apparatus.

According to the foregoing description, an object of this invention is to provide an optical switching element, comprising: a first light transmitting element, having a first light incident surface, a second light incident surface that is not parallel to the first light incident surface, and a light outgoing surface; a reflection substrate, arranged opposite to the second light incident surface of the first light transmitting element and having a first reflection surface with a predetermined angle that is not parallel to the second light incident surface, wherein a reflected light passes through the first light transmitting element and the reflection substrate and then is reflected by the first reflection surface of the reflection substrate; and an index variable material, sandwiching between the first light transmitting element and the reflection substrate, which has an index of refraction that is variable according to an applied external signal. By varying the index of refraction of the index variable material, an angle formed by the reflected light and a normal line of the light outgoing surface is changed such that an emitting direction of the reflected light is changed.

Preferably, the second light incident surface and the light outgoing surface of the first light transmitting element are not in parallel.

The optical switching element is switched between a first state and a second state, wherein the first state satisfies $\sin \phi_1 \geq n_a/n_1$, and the second state satisfies $\sin \phi_1 < n_a/n_1$, in which $n_1$ is the index of refraction of the first light transmitting element, $n_a$ is an index of refraction of a material surrounding the first light transmitting element, and $\phi_1$ is the angle formed by the reflected light and a normal line of the light outgoing surface.

The optical switching element further comprises a second light transmitting element that at least has a light incident surface that is substantially parallel and opposite to the light outgoing surface of the first light transmitting element within a predetermined distance; and a light outgoing surface that is not parallel to the light incident surface of the second light transmitting element.

In addition, the optical switching element further comprises a light transmitting plate that is optically in contact with the second light incident surface of the first light transmitting element and has an index of refraction substantially the same as that of the first light transmitting element.

The reflection substrate further comprises a second reflection surface having a tilt angle less than $90°-\theta_{2max}$ tilted from the reflection substrate and a common edge shared with the first tilt surface, wherein the angle $\theta_{2max}$ is defined as a maximum of an angle formed between a normal line of the second light incident surface and an incident light that enters the index variable material from the second light incident surface of the first light transmitting element.

The optical switching element can further comprise a plurality of reflection surfaces that are formed on the reflection substrate, wherein the reflection surfaces correspond respectively to driving elements used for applying external signals to the index variable material.

The index variable material mentioned above can comprise a liquid crystal or a compound of a polymer and a liquid crystal, where the liquid crystal is dispersed in a polymer matrix. The liquid crystal is a droplet having a grain size below one-fifth wavelength of the incident light. All liquid crystal molecules are substantially aligned in one direction when no voltage is applied.

The invention further provides a spatial light modulator, comprising a plurality of the optical switching elements mentioned above, wherein the optical switching elements are arranged in a two-dimensional array or in a one-dimensional array.

The invention further provides an image display apparatus, comprising: a spatial light modulator described above; a device such that a light is made incident to the spatial light modulator; and a displaying device for projecting an image formed by the spatial light modulator to a screen.

The invention further provides an image display apparatus, comprising a spatial light modulator above; a device such that a light is made incident to the spatial light modulator; a scanning device for scanning a light emitted from the spatial light modulator in a direction perpendicular to a line direction of the optical switching elements of the spatial light modulator; and a displaying device for projecting an image formed by the spatial light modulator to a screen.

The invention further provides an optical path element, comprising: a light incident unit such that an incident light is made incident through a light transmitting element; a light reflection unit for reflecting the incident light from the light incident unit; a light emitting unit for emitting a reflection light reflected by the light reflection unit out of the light transmitting element; an index variable material filled into an optical path in the light reflection unit; and a signal input device for providing a signal to the index variable material according to information to alter an index of refraction of the index variable material. The index of refraction of the index variable material is varied to a range such that the incident light is not totally reflected at an interface between the light transmitting element and the index variable material.

The light incident unit and the light emitting unit are surfaces respectively, wherein both surfaces are not in parallel. The optical switching element is switched between a first state and a second state, wherein the first state is that the total reflection occurs at the interface between the light transmitting element and an external material surrounding the light transmitting element, and the second state is that no total reflection occurs. The optical path element further comprises a second light transmitting element such that the incident light is emitted through the second light transmitting element.

The optical path element further comprises a light transmitting plate that is optically in contact with the light incident unit of the light transmitting element and has an index of refraction substantially the same as that of the light transmitting element. The light reflection unit comprises two surfaces with a shared common edge, an angle formed between a normal line of one of the surfaces of the light reflection unit and a normal line of the surface forming the light incident unit is less than $90°-\theta_{2max}$, wherein the angle $\theta_2$max is defined as a maximum of an angle formed between the normal line of the surface forming the light incident unit and the incident light that enters the index variable material. 22. The optical path element of any one of claim 16 to claim 21, wherein a plurality of reflection surfaces is formed on the reflection unit, wherein reflection surfaces correspond respectively to elements used for applying external signals to the index variable material.

The index variable material mentioned above can comprise a liquid crystal or a compound of a polymer and a liquid crystal, such that the liquid crystal is dispersed in a polymer matrix. The liquid crystal is a droplet having a grain size below one-fifth wavelength of the incident light. All liquid crystal molecules are substantially aligned in one direction when no voltage is applied.

The invention further provides a spatial light modulator, comprising a plurality of the optical path elements mentioned above, wherein the optical switching elements are arranged in a two-dimensional array or in a one-dimensional array.

The invention further provides an image display apparatus, comprising: a spatial light modulator described above; a device such that a light is made incident to the spatial light modulator; and a displaying device for projecting an image formed by the spatial light modulator to a screen.

The invention further provides an image display apparatus, comprising a spatial light modulator above; a device such that a light is made incident to the spatial light modulator; a scanning device for scanning a light emitted from spatial light modulator in a direction perpendicular to a line direction of the optical path elements of the spatial light modulator; and a displaying device for projecting an image formed by the spatial light modulator to a screen.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings in which:

FIGS. 11A and 11B show two states when the electric field is applied and not applied to the polymer dispersed liquid crystal;

DESCRIPTION OF THE PREFERRED EMBODIMENT

Figure 1A:
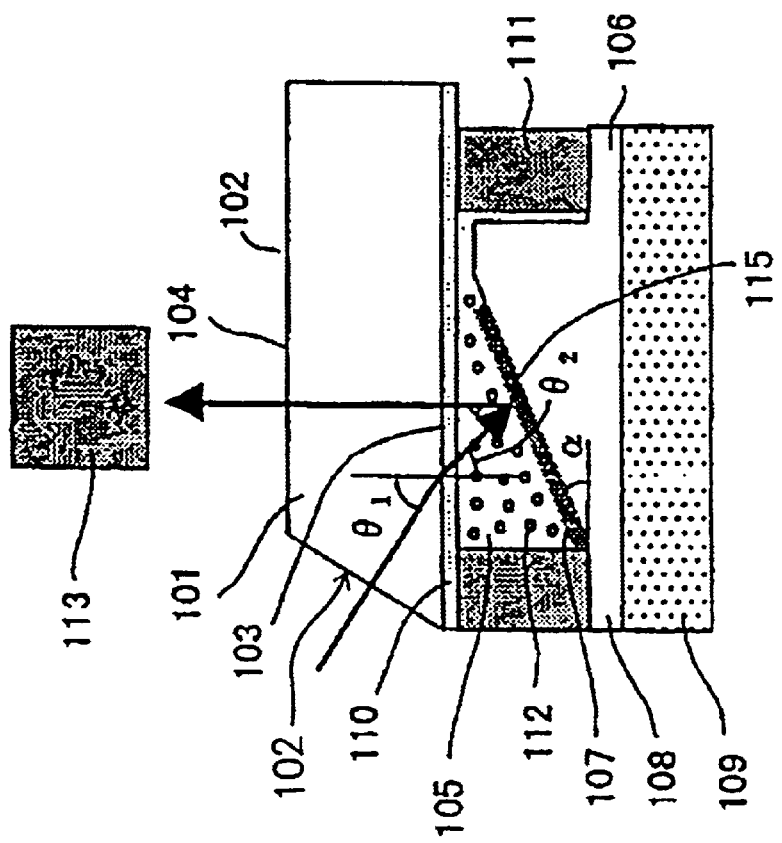
FIGS. 1A and 1B show the first embodiment according to the invention.

This invention provides an optical switching element, which comprises a light transmitting element, a reflection substrate, and index variable material (material with a variable index of refraction). The light transmitting element has a first light incident surface, a second light incident surface that is not parallel to the first light incident surface, and a light outgoing surface. The reflection substrate is arranged opposite to the second light incident surface of the light transmitting element and has a reflection surface with a predetermined angle that is not parallel to the second light incident surface, wherein a reflected light passes through the light transmitting element and the reflection substrate and then is reflected by the reflection surface of the reflection substrate. The index variable material is sandwiched between the light transmitting element and the reflection substrate and has an index of refraction that is variable according to an external signal applied. By varying the index of refraction of the index variable material, an angle formed by the reflected light and a normal line of the light outgoing surface is changed such that an emitting direction of the reflected light is changed.

The invention further provides an optical path element, comprising: a light incident unit such that an incident light is made incident through a light transmitting element; a light reflection unit for reflecting the incident light from the light incident unit; a light emitting unit for emitting a reflection light reflected by the light reflection unit out of the light transmitting element; an index variable material filled into an optical path in the light reflection unit; and a signal input device for providing a signal to the index variable material according to information to alter an index of refraction of the index variable material. The index of refraction of the index variable material is varied to a range that the incident light is not totally reflected at an interface between the light transmitting element and the index variable material.

Assuming that the index of refraction of the light transmitting element is $n_1$, the index of refraction of the index variable material is $n_2$, the angle formed between an incident light that is incident to the light transmitting element from the first light incident surface and a normal line of the second light incident surface is $\theta_1$, and the angle formed between the incident light that enters the index variable material and the normal line of the second light incident surface is $\theta_2$, then these parameters satisfy the following Snell's law:

$$\sin\theta_2/\sin\theta_1 = n_1/n_2 \qquad (1)$$

As the index of refraction of the index variable material $n_2$ varies in response to the external signal applied, the angle $\theta_2$ changes according to the above equation (1), by which the reflection angle at the reflection substrate is changed. Accordingly, the angle formed between the light incident to the light outgoing surface and the normal line of the light outgoing surface is changed, which variation is substantially equal to the variation of the angle $\theta_2$. However, when the index of refraction of the light transmitting element $n_1$, is larger than the index of refraction $n_a$ (usually, the material is air and its $n_a$ is 1) of the material surrounding the light transmitting element, the emitted light is refracted when the light is emitted from the light outgoing surface. As a result, the variation of the angle (the emitting angle) formed between the emitted light and the light outgoing surface is larger than the variation of the angle $\theta_2$. Therefore, if the optical output is detected at a predetermined position, the optical output varies according to the variation of the index of refraction $n_2$, by which the optical switching mechanism can be performed according to the external signal. The optical switching element of the invention does not limit the index of refraction of the light transmitting element $n_1$ and the incident angle $\theta_1$, and therefore a device or system having the optical switching element can be made by using low-cost material.

As described above, it is preferred that the second light incident surface and the light outgoing surface of the first light transmitting element are not in parallel, and thereby the variation of the emitting angle can become larger and a high S/N ratio can be obtained.

Additionally, it is preferred that the optical switching element is switched between a first state and a second state, wherein the first state satisfies the following equation (2):

$$\sin \phi_1 \geq n_a/n_1 \qquad (2)$$

and the second state satisfies the following equation (3):

$$\sin \phi_1 < n_a/n_1, \qquad (3)$$

wherein $n_1$ is the index of refraction of the first light transmitting element, $n_a$ is an index of refraction of a material surrounding the first light transmitting element, and $\phi_1$ is the angle formed by the reflected light and a normal line of the light outgoing surface. When the equation (2) is satisfied, the reflected light is totally reflected at the light outgoing surface (the total reflection occurs at the interface between the light transmitting element and its surrounding material). On the other hand, when the equation (3) is satisfied, the reflected light is refracted at the light outgoing surface towards the material surrounding the light transmitting element (not total reflection). Accordingly, the variation of the emitting angle becomes very large in comparison with the variation of the angle $\phi_1$ (or the angle $\theta_2$), and therefore a high S/N ratio can be obtained.

It is preferred that optical switching element further comprises a second light transmitting element, which at least has a light incident surface that is substantially parallel and opposite to the light outgoing surface of the first light transmitting element within a predetermined distance; and a light outgoing surface that is not parallel to the light incident surface of the second light transmitting element. The light emitted from the light transmitted element further enters the second light transmitted element and then emits from the light outgoing surface of the second light transmitted element. At this time, the emitting angle is larger than that when the second light transmitted element is not installed and therefore a high S/N ratio can be obtained.

In addition, it is preferred that the optical switching element further comprises a light transmitting plate that is optically in contact with the second light incident surface of the first light transmitting element and has an index of refraction substantially the same as that of the first light transmitting element. Accordingly, the manufacture becomes easy. After a device is made by using the structure comprising the light transmitting plate, the reflection substrate and the index variable material sandwiched therebetween, because the light transmitting element is good for use in optical contact with other element, the device can be easily made even if a light transmitting element having a complicated shape is used.

The reflection substrate can further comprise a second reflection surface having a tilt angle less than $90°-\theta_{2max}$ tilted from the reflection substrate and having a common edge shared with the first tilt surface, wherein the angle $\theta_{2max}$ is defined as a maximum of an angle formed between a normal line of the second light incident surface and an incident light that enters the index variable material from the second light incident surface of the first light transmitting element. Because the distance from the bottom of the reflection surface to the second light incident surface of the light transmitting element can be further reduced, the energy provided to the index variable material (the driving energy) can be further reduced.

A plurality of reflection surfaces is formed on the reflection substrate, wherein the reflection surfaces correspond respectively to elements (such as the driving element or pixels etc.) used for applying external signals to the index variable material. Because the distance from the bottom of the reflection surface to the second light incident surface of the light transmitting element can be further reduced, the driving energy can be further reduced.

The index variable material can be any material, only that its index of refraction can be varied in response to an energy provided from external. However, from the aspect of easy control, a material where the index of refraction is varied by the electric field, i.e., an optoelectric material, is preferred. Examples for the electro-optic material are a liquid crystal, or a solid crystal such as $LiNbO_3$ exhibiting the Pockels effect and $BaTiO_3$ or PLZT exhibiting the Kerr effect. However, in consideration of the large variation of the index of refraction and the fluidity per unit of the strength of the electric field, the liquid crystal is preferred. The variation of the angle $\theta_2$ can become larger because of the large variation of the index of refraction. As a result, because the emitting angle becomes larger, a high S/N ratio can be obtained. Additionally, the optical contact between the light transmitting element (or plate) and the reflection substrate can be easily implemented because of the fluidity of the index variable material.

Considering the response time, it is preferred to use a compound of a polymer and a liquid crystal as the index variable material. Preferably, this compound is formed by dispersing the liquid crystal droplets to the polymer matrix, i.e., the polymer dispersed liquid crystal. From experiment, the response time of the polymer dispersed liquid crystal becomes faster if the grain size of the liquid crystal droplet is reduced. In particular, when the droplet has a grain size below one-fifth wavelength of the incident light, the scattering reduces and the light transmission rate increases. Namely, the light loss reduces significantly.

Moreover, it is preferred that all liquid crystal molecules are substantially aligned in one direction when no voltage is applied. Because this direction is substantially perpendicular to a direction that the liquid crystal molecules align when a voltage is applied (the direction of the electric field) and therefore the difference of the indexes of refraction becomes larger, the variation of the angle $\theta_2$ can be enlarged. As a result, because the variation of the emitting angle can be enlarged, a high S/N ratio can be obtained.

The optical switching element of the invention can be used for constructing a spatial light modulator, wherein a plurality of the optical switching elements are arranged in a two-dimensional or a one-dimensional array. The structure of the spatial light modulator can be simplified. Additionally, because there is no limitation on the material used, the spatial light modulator can be of high-durability and low-cost. The one-dimensional spatial light modulator can also perform a two-dimensional spatial modulation by using a scanning device for scanning in a direction perpendicular to the lined optical switching elements. In comparison with the two-dimensional spatial modulation, the one-dimensional spatial modulation is cheaper and the cost can be reduced.

By assembling the spatial light modulator above, a device where a light is incident to the spatial light modulator; and a displaying device for enlarging and projecting an image formed by the spatial light modulator to a screen, a highly durable and low-cost image display apparatus can be obtained.

First Embodiment

Figure 1B:
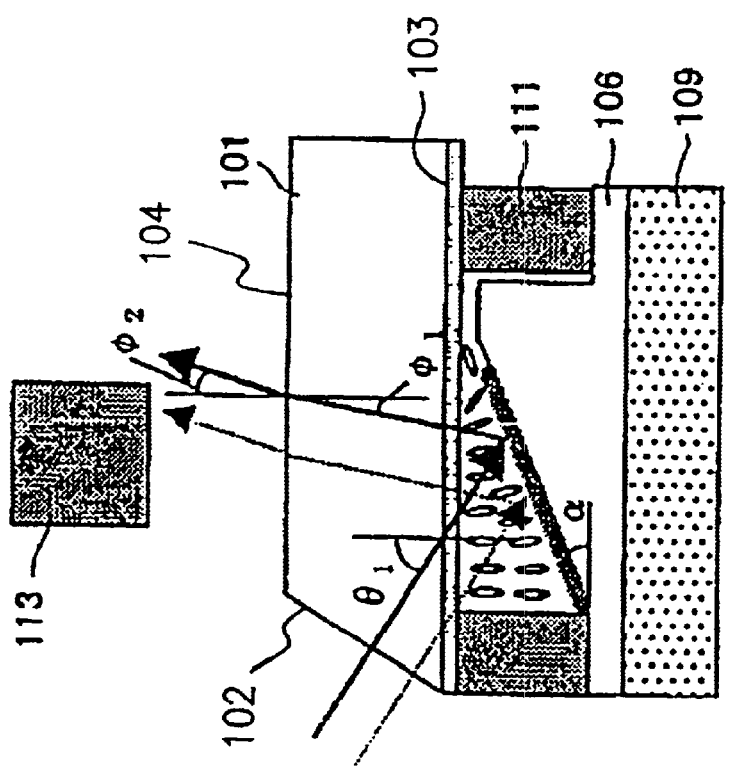

FIGS. 1A and 1B show the first embodiment according to the invention. As shown, a transparent light transmitting element 101 is made of glass or plastic for example. The light transmitting element 101 comprises a light incident (incoming) surface 102 where the light from a light source is incident, a light incident surface 103 where light from the light source is incident to a material with variable index of refraction (index variable material, hereinafter) 105, and a light outgoing (emitting) surface 104 where the light reflected by the reflection substrate 106 is emitted out of the light transmitting element 101. In the embodiment, the light incident surface 103 and the light outgoing surface 104 are in parallel. The reflection substrate 106 is formed by laminating a substrate 109 and an insulating layer 108 in sequence, wherein the substrate 109 can be made of silicon (Si) or glass etc., and the insulating layer 108 can be made of glass, plastic, or ceramic that is made of silicon oxide, silicon nitride or aluminum oxide etc. After tilt surfaces are formed on the insulating layer 108, metal films with a high-reflection rate, such as aluminum (Al) or silver (Ag), are formed on the tilt surfaces respectively and can be formed by a well-known method, such as a vacuum evaporation process, a sputtering process etc. If necessary, a patterning process can be also performed by a photolithographic and etching process. The metal film 107 also serves as an electrode. Preferably, driving elements can be formed on the substrate 109 for applying signal voltages to the metal film 107.

The insulating layer sheet 108 can be also as the substrate 109 or a metal sheet servers as the substrate 109, on which the tilt surfaces are directly formed to be the reflection substrate 106. For example, a preferred method for forming the tilt surfaces can be an anisotropic etching process, where a patterning and dry etching processes are performed using a photomask with an area gradation or a density gradation pattern formed thereon. The index variable material 105 can be preferably a liquid crystal, in which a nematic liquid crystal, a smectic liquid crystal, or a cholesteric liquid crystal can be used. Additionally, a liquid crystal compound containing one or more than two liquid crystals, or a mixture also containing other than liquid crystal compound can be used as the index variable material 105.

A transparent electrode, which is composed of ITO etc., is formed on the light incident surface 103 for applying a voltage to the index variable material 105. When the material with variable index of refraction is composed of a material with fluidity, which is similar to the liquid crystal, it is preferred to form sealing layer 111 made of epoxy resin, 110 etc. to confine the index variable material 105. For example, an opening is left on a portion of the thermosetting epoxy resin in the vicinity of the light transmitting element (or the reflection substrate). After printing, the sealing layer 111 is adhered to the light transmitting element (or the reflection substrate) and then a thermosetting process is performed. After the liquid crystal is filled through the filling opening, the filling opening is sealed by adhesive. In addition, it is preferred to form an anti-reflection coating on the light incident surface 102 and the light outgoing surface 104 of the light transmitting element 101.

FIG. 1A shows that when the index of refraction $n_2$ of the material 105 is larger than the index of refraction $n_1$ of the light transmitting element 101, the refraction angle $\theta_2$ is smaller than the incident angle $\theta_1$ according to the equation (1). If the tilt angle $\alpha$ of the reflection substrate 106 is set to $\alpha=\theta_2/2$, the reflected light is perpendicularly incident to the light outgoing surface 104 and then is emitted out of the light transmitting element 101. FIG. 1B shows that when the indexes of refraction n1, n2 are substantially equal, the reflection angle becomes larger than that in FIG. 1A because incident angle $\theta_1$ and the refraction angle $\theta_2$ are almost the same. The reflected light is incident to the light outgoing surface 104 by an angle of about $\phi_1=\theta_1-\theta_2$. When the material surrounding the light transmitting element 101 is the air (na=1), then the reflected light is refracted at the light outgoing surface 104 with a refraction angle $\phi_2=\sin^{-1}(n_1 \cdot \sin \phi_1)$. Assuming a beam radius of the outgoing light is r and the optical output is measured at a distance larger than r/tan $\phi_2$ from the light outgoing surface 104, the optical output is detected in FIG. 1A, but is not detected in FIG. 1B, thereby a excellent S/N ration can be obtained.

For example, the light transmitting element 101 can be made of crown glass BK7 (nd=1.517), and the material 105 with variable refraction index can be nematic liquid crystal E7 (index of refraction for the ordinary light no is 1.522 and index of refraction for the extraordinary ne is 1.746). As shown in FIG. 1A, the liquid crystal molecules 112 with an alignment layer (not shown) are horizontally arranged with respect to the light incident surface 103 and perpendicular to the drawing. The alignment layer can use well known material, such as the SiO, or polyimide etc. In addition, the alignment layer is preferred to be formed on the transparent electrode 110 and the metal film 107.

In FIG. 1A, if a laser beam with a wavelength of 633 nm is a S polarization and is incident with the incident angle $\theta_1=60°$, the refraction angle becomes $\theta_2=49°$ based on the equation (1) because the index of refraction of the liquid crystal with respect to the above laser beam is $n_2=ne=1.746$. Assuming the tilt angle $\alpha=24.5°$, the reflected light is perpendicularly emitted out of the light outgoing surface 104. Additionally, as shown in FIG. 1B, when a voltage is applied between the transparent electrode 110 and the metal film 107, the liquid crystal molecules are aligned with the direction of the electric field. For the same incident light, because the index of refraction of the liquid crystal becomes $n_2=no=1.522$, the incident light and the reflected light propagate straightforward substantially, where the light is incident to the light outgoing surface 104 with the incident angle $\phi_1=11°$ and then refracted at the light outgoing surface 104 with the refraction angle $\phi_2=17°$. The angle formed by the light incident surfaces 102 and 103 is not particularly limited, but near $\theta_1$ is better in consideration of small reflection loss at the light incident surface 102.

As described above, the incident light is S polarization, but a P polarization light can be also used, in which the light vibrating condition when the voltage is applied and no voltage is applied are reversed. Because the reflection loss at the interface can be reduced when the P polarization light is used, the P polarization light is preferred if considering the light utilization rate. Furthermore, although the tilt angle α is set $θ_2/2$, the setting of $α=θ_1/2$ can be also used. In that situation, as shown in FIG. 1B, the reflected light is perpendicularly emitted from the light outgoing surface 104; in FIG. 1A, the reflected light is emitted with an angle larger than 17°. Moreover, the variant examples above can be also applied to the other embodiments that will be described later.

For a single element, when the radius of the outgoing beam is small, the light can be detected at a relative near distance, so that a sufficient S/N ratio can be obtained. However, when the illuminating area is large (for example, a spatial light modulator is used), light leakage can be detected as the light shown in dashed line in FIG. 1B, causing the reduction of the S/N ratio.

Second Embodiment

Figure 2A:
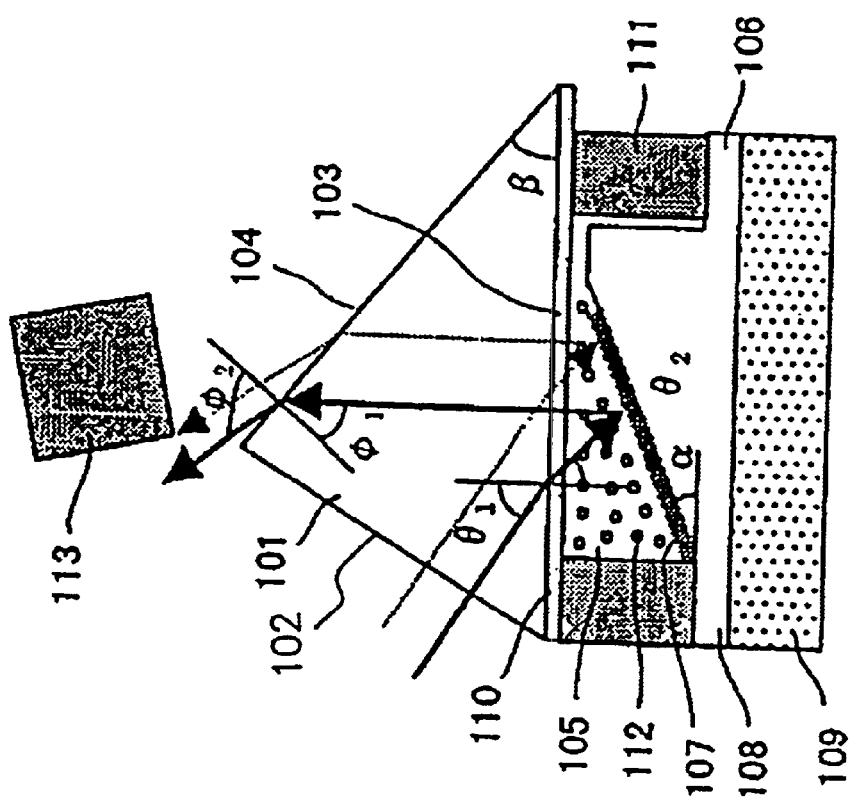
FIGS. 2A and 2B show the second embodiment according to the invention.
Figure 2B:
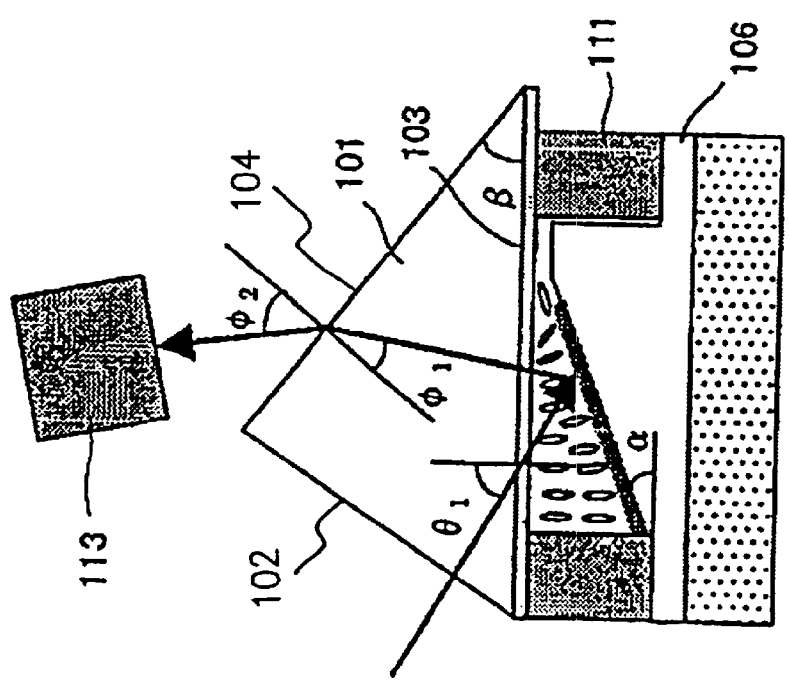

FIGS. 2A and 2B show the second embodiment according to the invention. Except that the light outgoing surface 104 and the light incident surface 103 are not in parallel, other elements are the same as in the first embodiment. In the second embodiment, the angle β formed by the light outgoing surface 104 and the light incident surface 103 is β=40°. In FIG. 2A, the reflected light (by the metal film 107) is incident to the light outgoing surface 104 with an incident angle $φ_1=40°$ and then refracted with a refraction angle $φ_2=77°$. In FIG. 2B, the reflected light is incident to the light outgoing surface 104 with an incident angle $φ_1=29°$ and then refracted with a refraction angle $φ_2=47°$. Because the emitting angle (refraction angle) difference between FIG. 2A and FIG. 2B is 30°, which is larger than that in the first embodiment, the detected light leakage reduces even though the illuminating area is large, thereby the S/N ratio cannot be reduced.

Third Embodiment

Figure 3A:
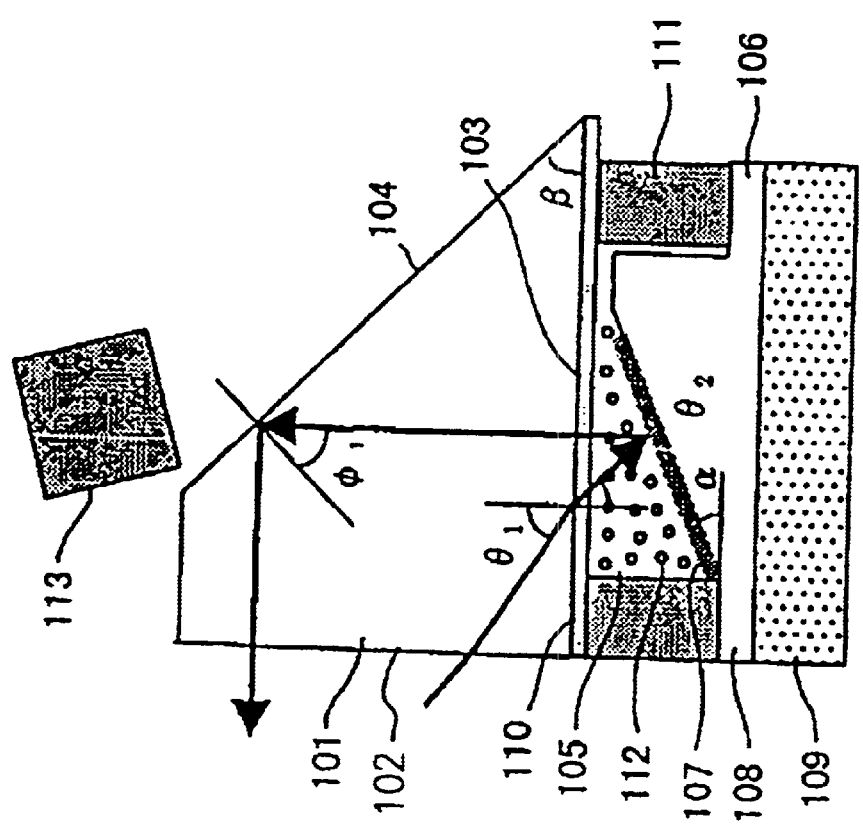
FIGS. 3A and 3B show the third embodiment according to the invention.
Figure 3B:
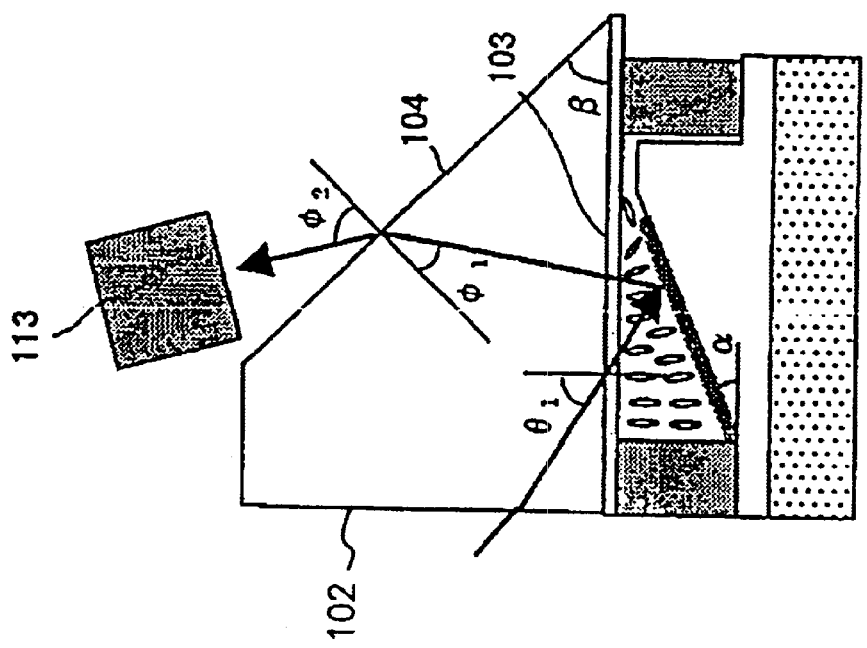

FIGS. 3A and 3B show the third embodiment according to the invention. Basically, the third embodiment almost has the same structure as the second embodiment, except that the angle β formed by the light outgoing surface 104 and the light incident surface 103 is β=45°, larger than the angle in the second embodiment. In FIG. 3A, the reflected light (by the metal film 107) is incident to the light outgoing surface 104 with an incident angle $φ_1=45°$. At this time, because the equation (2) is satisfied, the reflected light is totally reflected at the light outgoing surface 104 and then emitted from the light incident surface 102. In FIG. 3B, the reflected light is incident to the light outgoing surface 104 with an incident angle $φ_1=34°$ and then refracted with a refraction angle $φ_2=58°$. Because the emitting angle (refraction angle) difference between FIG. 3A and FIG. 3B is 180°-(45°+58°)=77°, the light leakage is almost not detected and a high S/N ration can be obtained.

Fourth Embodiment

Figure 4A:
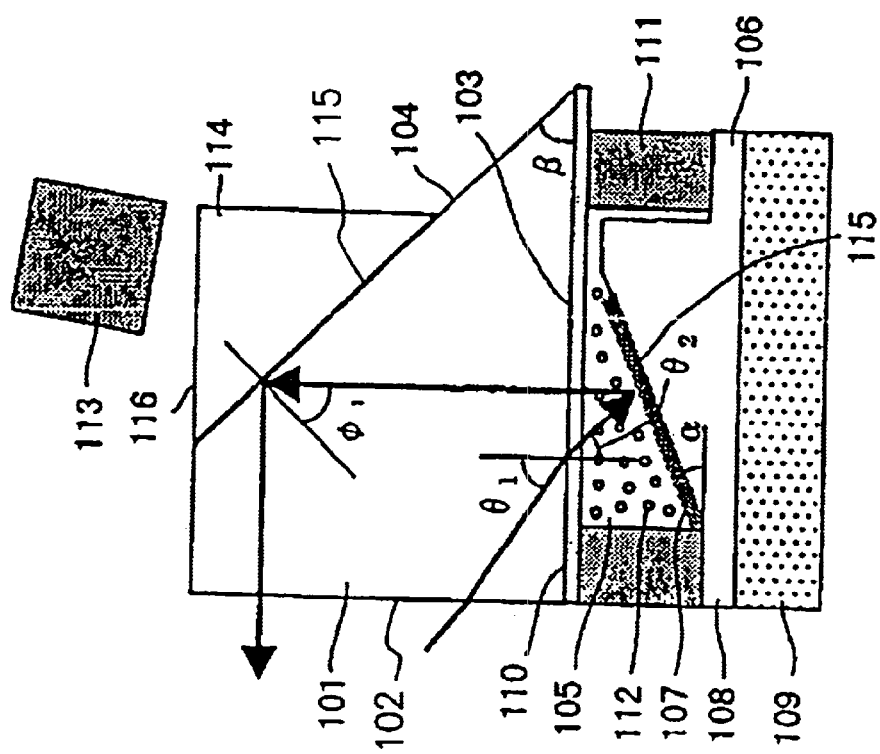
FIGS. 4A and 4B show the fourth embodiment according to the invention.
Figure 4B:
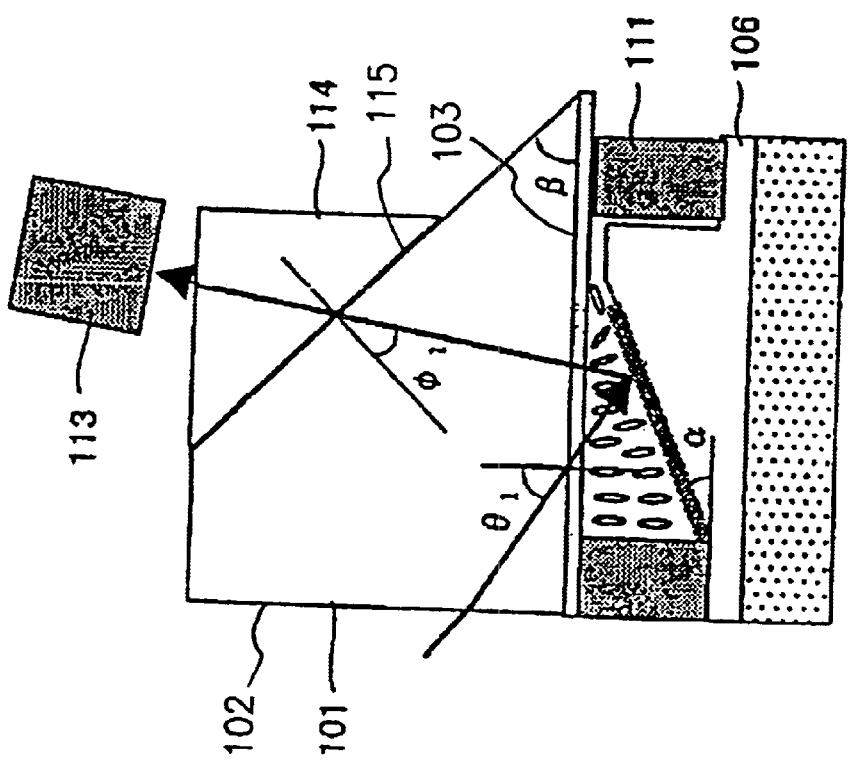

FIGS. 4A and 4B show the fourth embodiment of the invention. In FIGS. 4A and 4B, a second light transmitting element 114 is composed of the same material as the light transmitting element 101. The light transmitting element 114 has a light incident surface 115 and a light outgoing surface 116, in which the light incident surface 115 is substantially in parallel with and opposite to the light outgoing surface 104 by a predetermined distance, and the light outgoing surface 116 is not in parallel to the light incident surface 115. In this embodiment, by roughly sealing, a space (an air layer) with a thickness about the wavelength of the incident light is formed between the light outgoing surface 104 and the light incident surface 115 (that is finished with a smoothness of about the wavelength of the incident light). The light outgoing surface 116 of the light transmitting element 114 and the light outgoing surface 103 of the light transmitting element 101 are substantially in parallel. The other structure settings are the same as the third embodiment.

In FIG. 4A, the reflected light (by the metal film 107) is totally reflected at an interface between the light outgoing surface 104 and the air layer (the space), and then emitted from the light incident surface 102. In FIG. 4B, the light emitted from the light outgoing surface propagates straightforward (in fact, moves parallel about the wavelength) substantially, and then is incident to the second light transmitting element 114 and emitted from the second light outgoing surface 116. In this situation, because the light emitting angle between FIG. 4A and FIG. 4B exceeds 90 degrees, the light leakage is not detected and a high S/N ratio can be obtained. Additionally, as the light incident surface 102 and the light outgoing surface 104, it is also preferred to form anti-reflection coatings on the light incident surface 115 and the light outgoing surface 116.

Fifth Embodiment

Figure 5A:
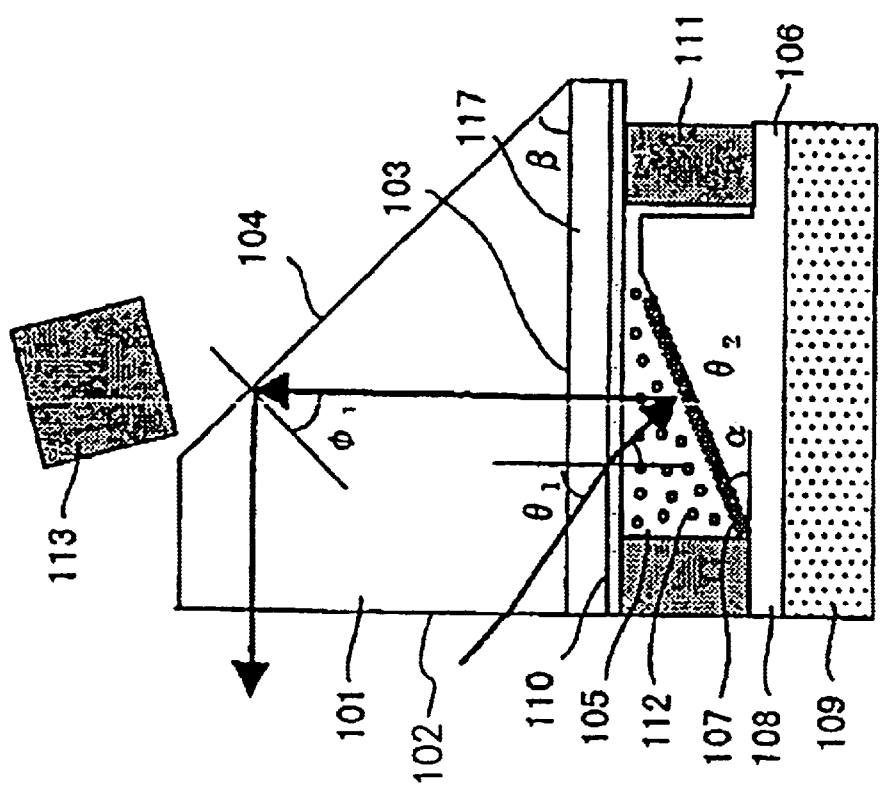
FIGS. 5A and 5B show the fifth embodiment according to the invention.
Figure 5B:
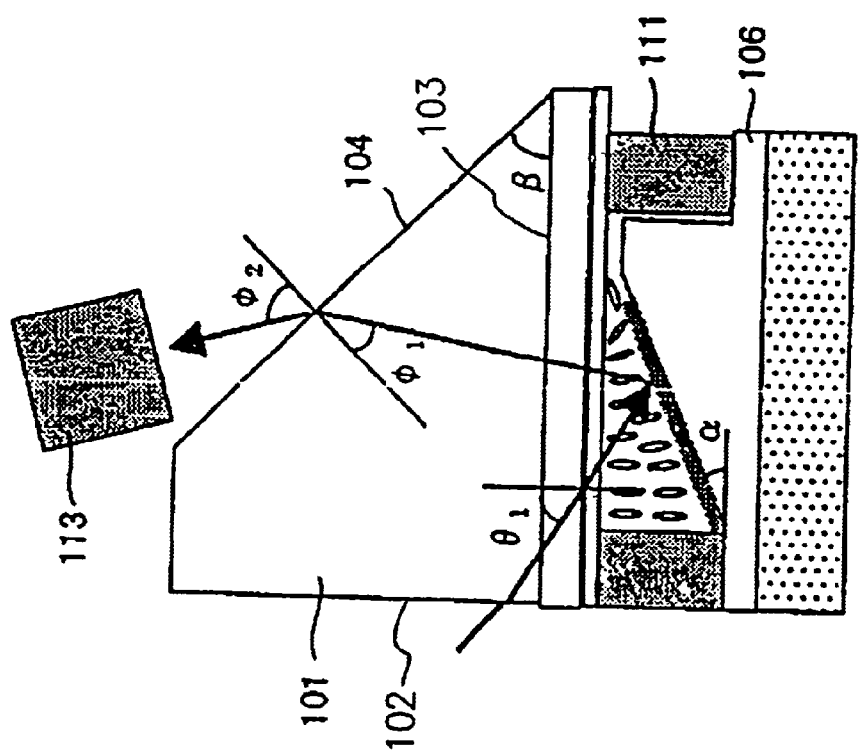

FIGS. 5A and 5B show the fifth preferred embodiment according to the invention. As shown, a light transmitting plate 117, substantially having the same index of refraction as the light transmitting element 101, is optically in contact with the light transmitting element 101. Except for the above light transmitting plate 117, all the other elements are the same as those in the third embodiment and are operated in the same manner. The optical contact means that the space, where the two light transmitting elements 101, 117 are tightly adhered, is sufficiently smaller than the wavelength used for the device. For example, the two light transmitting elements 101, 117 can be glued by using fluid material between them. After the fluid material securely adheres the two light transmitting elements 101, 117, a curing process can be further performed. Preferably an exemplary fluid material can be a liquid or a photo setting adhesive with the same index of refraction as the light transmitting elements 101, 117 and with a low volatility. In this embodiment, because the light transmitting plate 117 is in contact with index variable material 105, a transparent electrode 110 is formed on the light transmitting plate 117. Because the attachment of the light transmitting plate 117 is performed at the final step, the process for making the main device part can be finished without using a complicated light transmitting element. Therefore, the yield rate can be improved and the device cost is reduced.

Sixth Embodiment

Figure 6A:
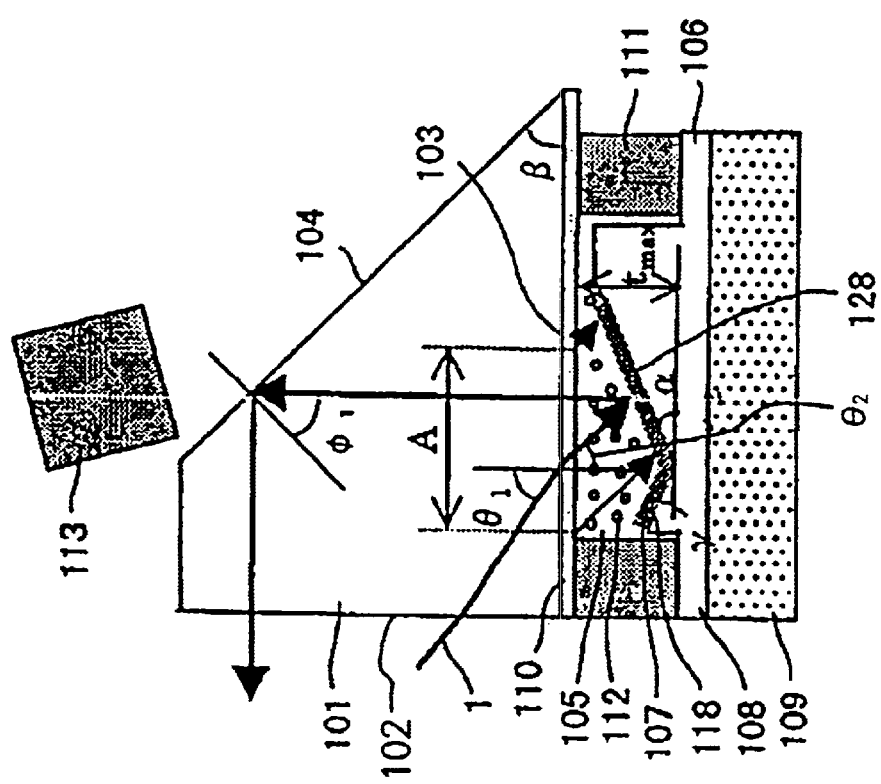
FIGS. 6A and 6B show the sixth embodiment according to the invention.
Figure 6B:
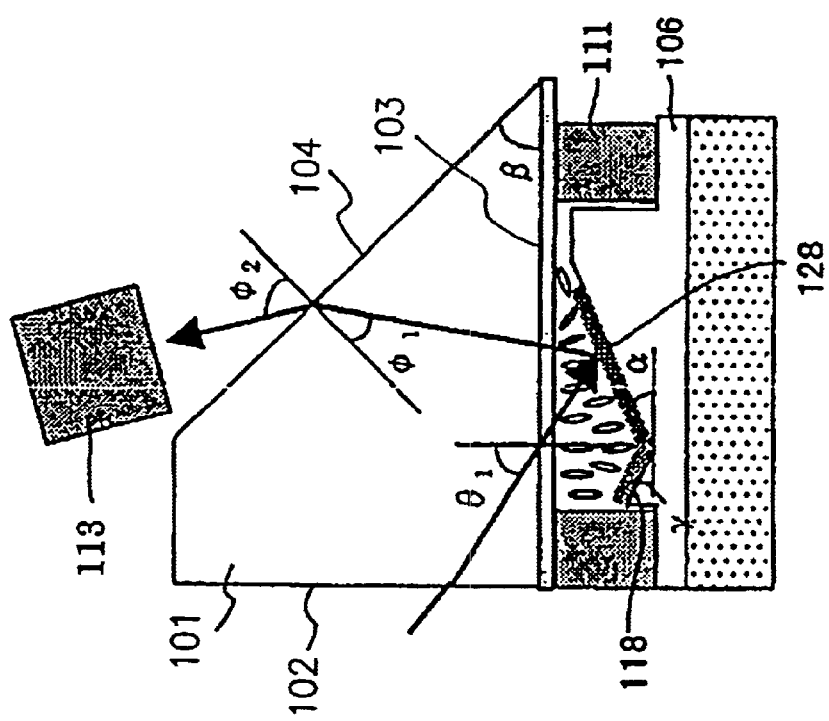

FIGS. 6A and 6B show the sixth preferred embodiment according to the invention. In the sixth embodiment, when the incident light 1 enters the index variable material 105, the maximum angle of the refraction angle $θ_2$ from the normal line of the light incident surface 103 is assumed to $θ_{2max}$. A tilt (reverse tilt) surface 118 having a common edge with the reflection surface 128 is formed in the reflection substrate 106 with a tilt angle γ smaller than $90°-θ_{2max}$ that is tilted from the substrate 106. Except for the above setting, the others are the same as described in the third embodiment. In this situation, because $\theta_{2max}=\theta_1=60°$, if the angle $\gamma$ is set below 30°, the illuminating area A of the light, which is incident to the light incident surface 103, is the same as the third embodiment. Therefore, a distance from the bottom of the reflection surface 128 to the light incident surface 103 of the light transmitting element 101, i.e., the maximum thickness $t_{max}$ of the index variable material 105, can be reduced, and the driving voltage can be further reduced.

Seventh Embodiment

Figure 7A:
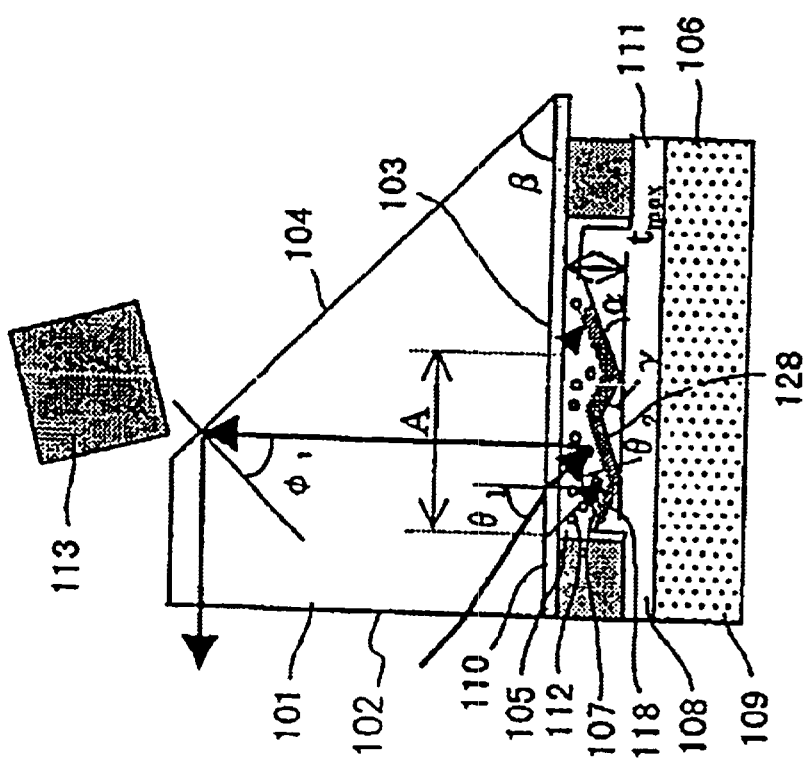
FIGS. 7A and 7B show the seventh embodiment according to the invention.
Figure 7B:
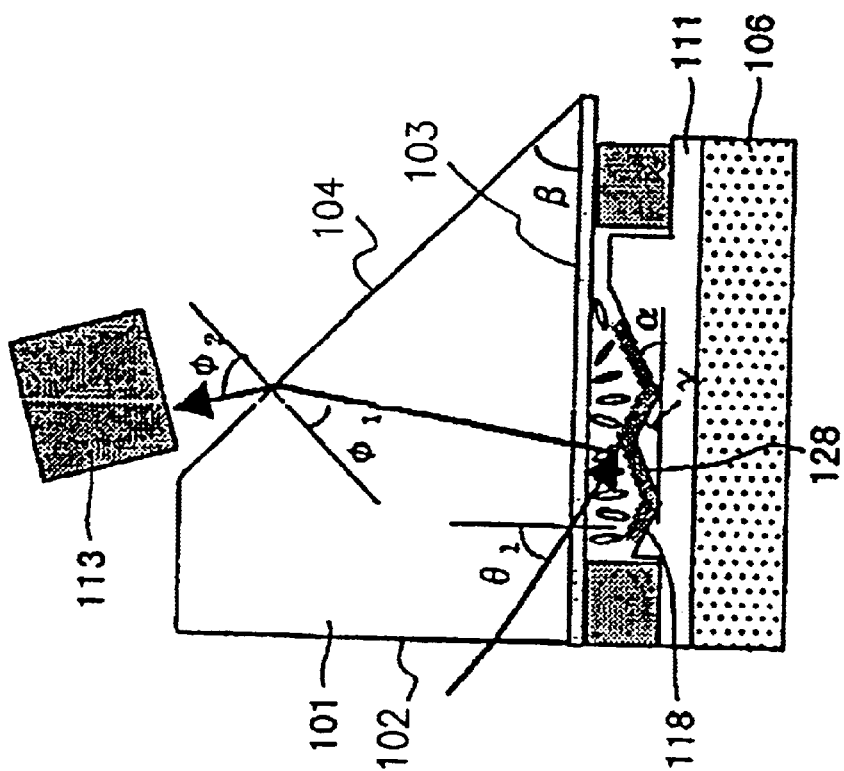

FIGS. 7A and 7B show the seventh preferred embodiment according to the invention. In the seventh embodiment, a plurality of reflection surfaces 128 is arranged within the illuminating area A. For example, two reflection surfaces 128 are formed in the illuminating area A in FIG. 7A. It can be learned from FIG. 7A that the maximum thickness $t_{max}$ of the index variable material 105 can be further reduced when the illuminating area A is the same as shown in FIG. 6A. Therefore, the driving voltage can be reduced considerably.

According to the invention, because the index of refraction of the light transmitting element 101 can be equal to or smaller than the smallest index of refraction (no) of the index variable material (liquid crystal) 105, the most typical optical glass BK7 is used as an example in the foregoing embodiments. However, with a conventional technology (disclosed in Japanese Laid Open 2000-171813), that uses the total reflection that occurs at the interface between the liquid crystal and the light transmitting element, in the same condition as the embodiment where the liquid crystal E7 is used and the incident angle is 60°, the index of refraction of the light transmitting element has to be greater than 1.76, and therefore the cost increases.

Eighth Embodiment

Figure 8A:
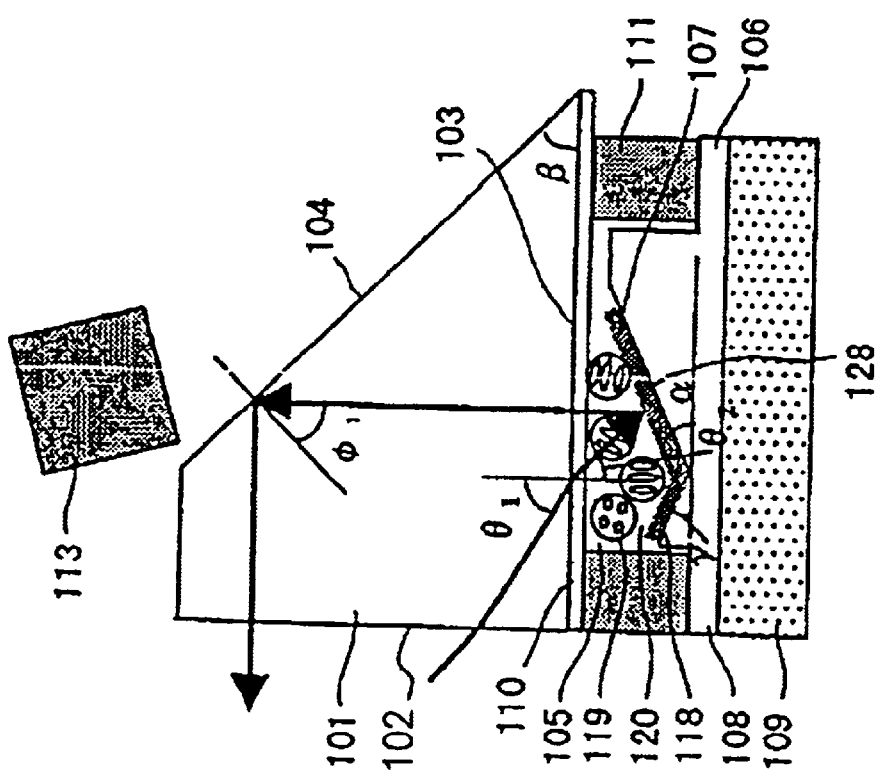
FIGS. 8A and 8B show the eighth embodiment according to the invention.
Figure 8B:
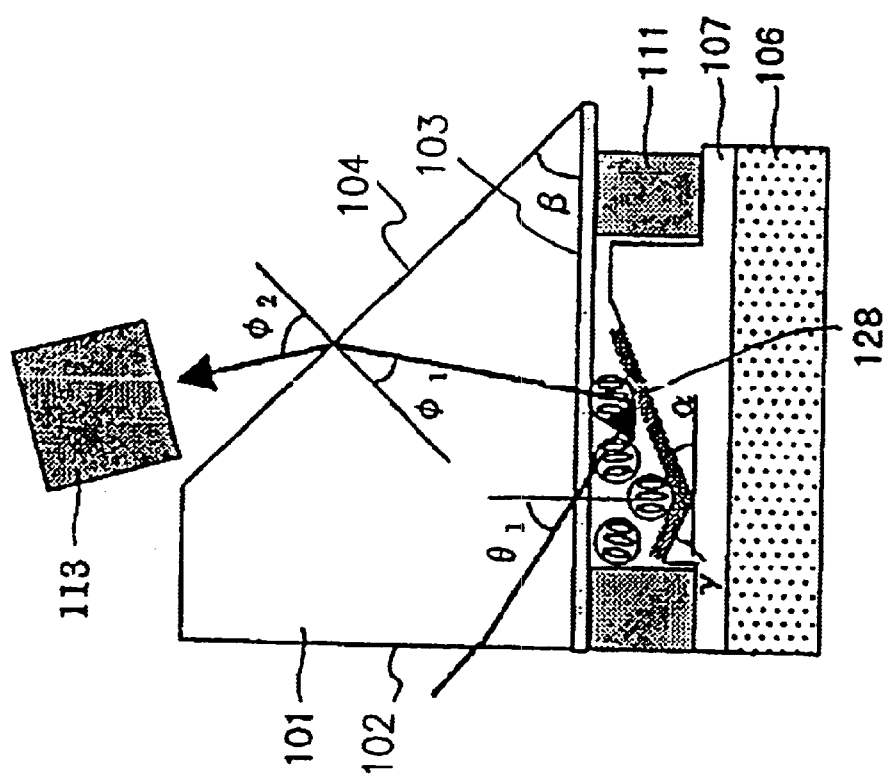

FIGS. 8A and 8B show the eighth preferred embodiment according to the invention. The eighth embodiment has the same configuration as the sixth embodiment except that a polymer dispersed liquid crystal is used. The polymer dispersed liquid crystal means that liquid crystal droplets 119 are dispersed in a polymer matrix 120. The liquid crystal material can use a nematic liquid crystal, a smectic liquid crystal, or a cholesterol liquid crystal. Additionally, a liquid crystal compound containing one or two more liquid crystals, or a mixture also containing other than a liquid crystal compound can be used. Preferably, the material for the polymer matrix 120 is a transparent polymer, but a thermo plastic resin, a thermo setting resin or a photo setting resin can be also used.

The method for making the polymer dispersed liquid crystal can be the following exemplary processes. (1) method of polymerization phase separation: make a solution by using the liquid crystal and thermo or photo setting monomer, oligomer, or pre-polymer, and perform the polymerization to separate phase. (2) method of solvent vaporization phase separation: make a solution by using the liquid crystal and the polymer, and separate phase by vaporizing the solvent. (3) method of thermo phase separation: heat and dissolute the liquid crystal and the thermoplastic polymer, and separate phase by cooling.

Considering the ease of the manufacturing process and the separation for liquid crystal phase, it is preferred that the polymer can use ultraviolet-ray setting resin such as the ultraviolet-ray setting acrylic resin. In particular, it is preferred to use materials containing acrylic monomer or acrylic oligomer that are polymerized and set by illuminating with the ultraviolet ray. The examples for the monomer or oligomer are as follows: poly ester acrylate, poly urethane acrylate, epoxy acrylate, poly butadiene acrylate, silicone acrylate, melamine acrylate, and poly phosphazene methacrylate etc. The other example can be thiol-ene series that has a high photo setting speed.

In order to increase the speed of the polymerization, a photo-polymerization initiator can be used. The examples of the photo-polymerization initiator are as follows: acetophenone class (such as dichloro acetophenone or trichloro acetophenone), 1-hedroxy cyclohexyl phenyl ketone, benzophenone, Michler's ketone, benzoyl, benzoin alkylether, benzil dimethyl ketal, mono-sulfide, thioxanthone class, azo compound, diallyl iodonium, triallyl sulfonium, bis-(trichloro methyl), and triazine etc.

The liquid crystal material is uniformly dissolved in the ultraviolet-ray setting compound to form a liquid material. After the liquid material is filled between the reflection substrate 106 and the light transmitting element 101, the ultraviolet-ray setting compound is then set by the illumination of the ultraviolet ray and at the same time the liquid crystal material is phase separated, thereby a polymer dispersed liquid crystal layer is formed. For example, a nematic liquid crystal BL24(no=1.53 and ne=1.717, Merck Japan, ltd.) is dissolved in a ultraviolet-ray setting pre-polymer (NOA 81, Norand company) and then illuminated by the ultraviolet ray (400 mW/cm$^2$), wherein the weight concentration of the liquid crystal is 45 w % and the average grain size of the liquid crystal droplet is 60 nm. In FIG. 8A, because the directions of the aligned droplets 119 of the liquid crystal molecules are random, the whole polymer dispersed liquid crystal layer becomes an optical isotropic medium, and its index of refraction can be an average in volume ($\approx$1.57) of the average index of refraction of the liquid crystal ($\approx$(2no+ne)/3$\approx$1.58) and the index of refraction of the polymer matrix ($\approx$1.56). In addition, no alignment process is performed in advance in the above situation. When the light transmitting element 101 is crown glass BK7 (nd=1.517) and the incident angle is 75°, the refraction angle becomes 69°. If the tilt angle $\alpha$ is set to 34.5°, the reflected light by the reflection surface 128 is almost perpendicularly incident to the incident surface 103. If the tilt angle $\beta$ is set to 43°, the reflected light is then incident to the light outgoing surface 104 with an incident angle $\phi_1$=43°. At this time, because the equation (2) is satisfied, the reflected light is totally reflected at the light outgoing surface 104 and then emitted from the incident surface 102.

In FIG. 8B, the liquid crystal molecules are aligned with the electric field, the index of refraction of the polymer dispersed liquid crystal for the S polarization light can be an average in volume ($\approx$1.54) of the index of refraction of the liquid crystal ($\approx$1.53) and the index of refraction of the polymer matrix ($\approx$1.56). At this time, the refraction angle becomes 72°, and the reflected light is incident to the light outgoing surface 104 with an incident angle $\phi_1$=40° and then refracted by the light outgoing surface 104 with a refraction angle $\phi_2$=77°. In this situation, because the difference of the emitting angles is 180°-(43°+77°)=60°, a high S/N ratio can be obtained. Additionally, the switching time between the two states in FIGS. 8A and 8B is an order of several 10 $\mu$s, which is faster by about one hundred times in comparison with the bulk liquid crystal.

The detailed relationship between the response time and the droplet size of the liquid crystal is described below. The liquid crystal droplet size in the polymer dispersed liquid crystal can vary with the composition of the pre-polymer, the mixing concentration of the liquid crystal, and the strength of the ultraviolet ray for setting etc.

Figure 9:
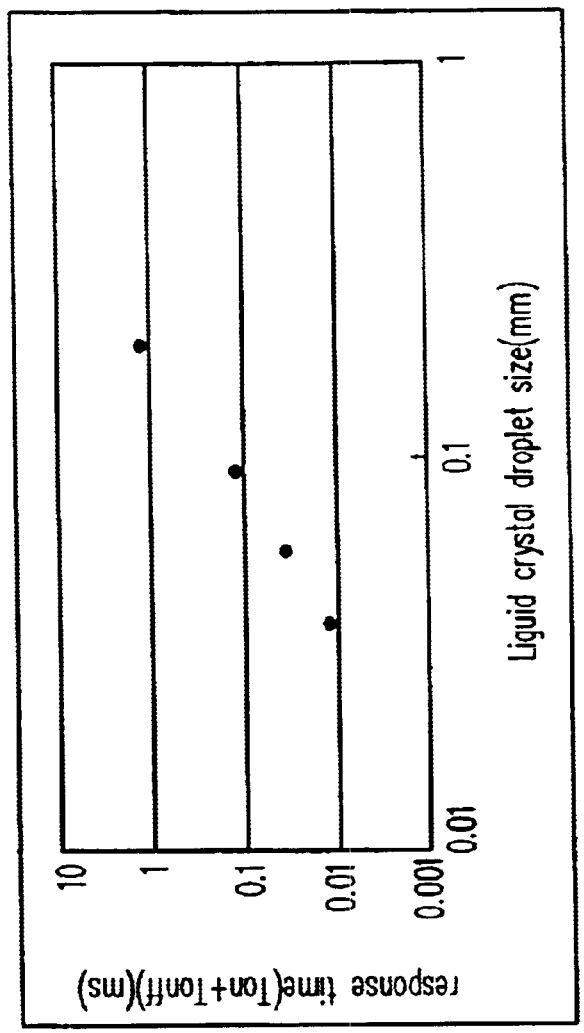
FIG. 9 is a graph showing the relationship between the droplet size and the response time.

FIG. 9 shows a graph of a relationship between the liquid crystal droplet size and the response time. This graph is made by properly choosing that the liquid crystal material is E7 and BL24 (Merck Japan ltd.) and the pre-polymer is NOA 60, 65 and 81 (Norand company).

Figure 10:
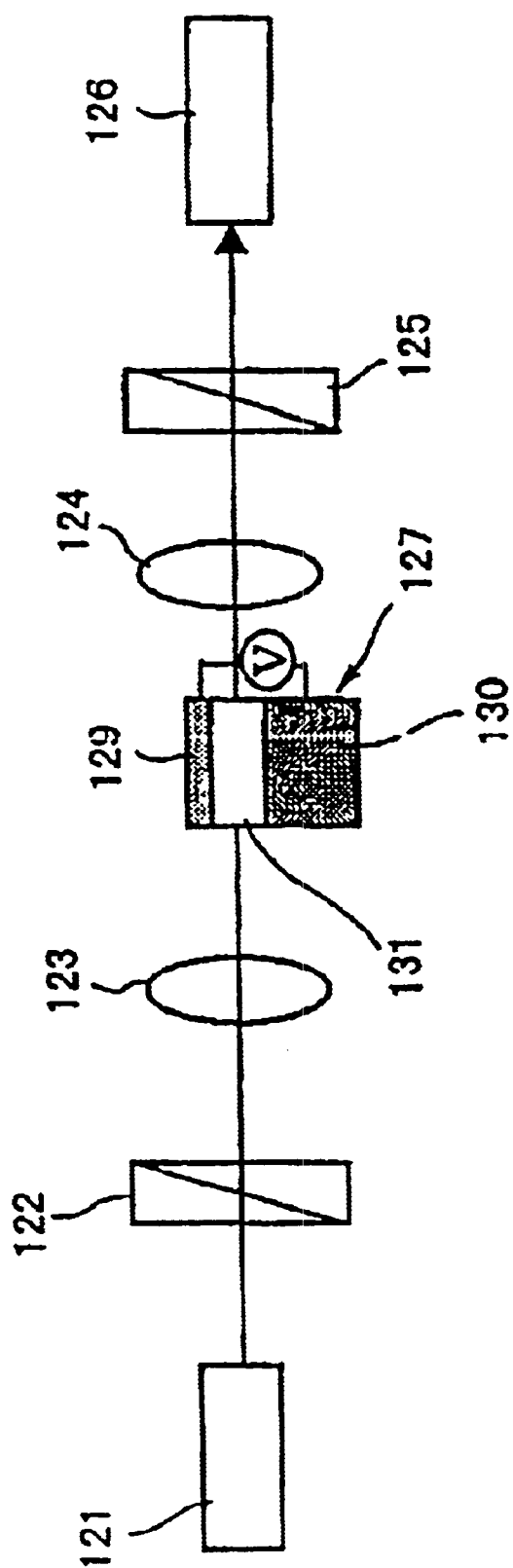
FIG. 10 shows a apparatus for measuring the response time.

FIG. 10 shows an exemplary apparatus for measuring the response time. The measurement is to calculate a summation of a time $T_{on}$ that the optical output is activated and a time $T_{off}$ that the optical output is deactivated when a pulse voltage (200V, for example) is applied to a sample 127. The sample 127 comprises a polymer dispersed liquid crystal layer 131 with a thickness of 20 μm and an optical path of 1 mm.

FIGS. 11A and 11B show states of the polymer dispersed liquid crystal when the electric field is and is not applied. When the electric field is not applied as shown in FIG. 11A, the indexes of refraction in the x, the y and the z axis are the same because the directions of the liquid crystal droplets are random, thereby the whole polymer dispersed liquid crystal layer becomes an optical isotropic medium. In contrast, when the electric field is applied as shown in FIG. 11B, because the molecular axes of the liquid crystal molecules are aligned with the direction of the electric field, the index of refraction in the z-axis direction becomes larger and the indexes of refraction in the y-axis and the x-axis directions are the same becomes smaller.

As shown in FIG. 10, when the light emitted from the laser source 121 is incident in the x-direction that is perpendicular to the electric field, the polarization state can be changed because the occurrence of the birefringence in the y-z plane, and therefore the optical output passing to the through the analyzer 125 is changed. Although the invention does not use the birefringent phenomenon, the response time in FIG. 9 is also suitable for the invention because the measurement also utilizes the variation of the index of the refraction due to the behavior of the liquid crystal molecules when the electric field is applied. From FIG. 9, the response time becomes faster when the droplet size of the liquid crystal becomes smaller.

The grain size of the liquid crystal droplet is below one-fifth (⅕) wavelength of the incident light, and preferably is below one-tenth (1/10) wavelength of the incident light from the consideration of the light transmitting rate. The following shows a result of the light transmitting rate according to the Rayleigh scattering theory. Assuming that a spherical scattering body has volume of V and a number density of N, the light transmitting rate T for a medium with a thickness L can be expressed in the following equation (4).

$$T = \exp(-NRL), \quad R = 24\pi^3 \frac{\left(\frac{m^2-1}{m^2+2}\right)^2 V^2}{\lambda^4} \quad (4)$$

In equation (4), R is the scattering cross-sectional area, m is the ratio of the indexes of refraction of the scattering body and the medium, and λ is the wavelength of the light that is used. Assuming m=1.07 and L=100 μm, the light transmitting rate T is calculated by using the grain size d of the scattering body (the liquid crystal droplet), the volume integral rate (=NV) and the wavelength λ as the parameters. According to the equation (4), as the grain size d (i.e., the volume V) becomes larger or the wavelength λ becomes smaller, the light transmitting rate T decreases. If considering the light utilization rate, it is preferred to set the light transmitting rate T higher than 90% (T=0.9).

Figure 12:
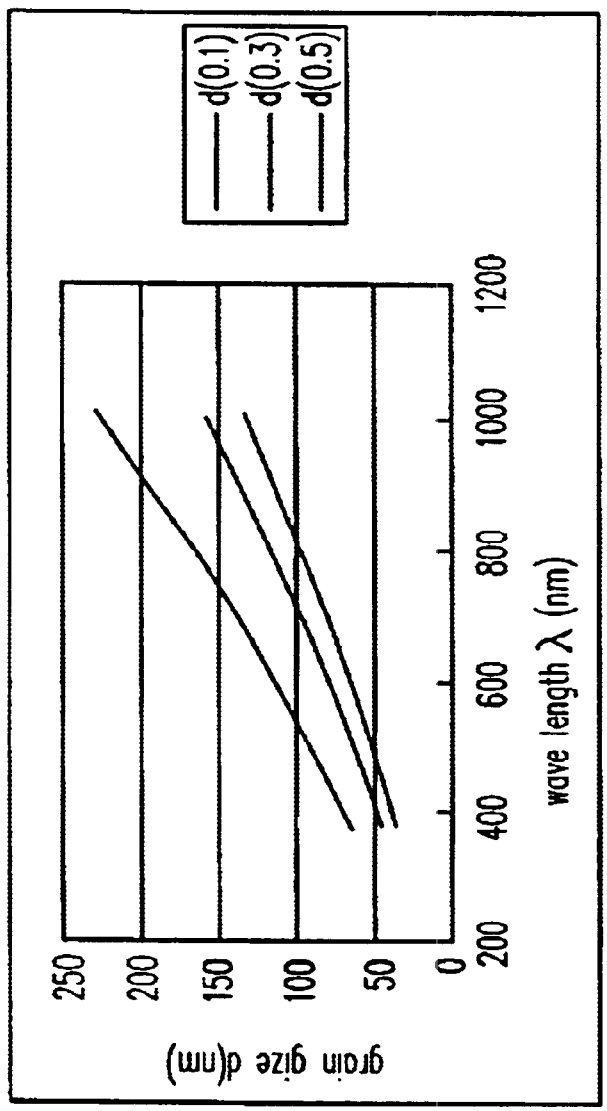
FIG. 12 is a graph showing the relationship between the droplet size when the transmission rate is 90% and the wavelength using the volume integral rate as a parameter.

FIG. 12 is a plot showing the grain size d versus the wavelength λ with T=0.9, under a condition such that the volume integral rate (NV) is 10% (d(0.1)), 30% (d(0.3)) and 50% (d(0.5)). Because the index variation is small, as the volume integral rate is small, the S/N ratio cannot be kept at a high value, therefore it is better that the volume integral rate (NV) is higher than 10%, and 50% is preferred. If the volume integral rate (NV) is higher than 50%, the manufacturing process becomes very difficult. Therefore, as shown in FIG. 12, it is better that d is below λ/5, and preferably d is below λ/10. Moreover, although the above calculation is made in a condition where m and L are fixed, the above range of the grain size is also suitable if m and L for the actual device are under the fixed values above.

Ninth Embodiment

Figure 13A:
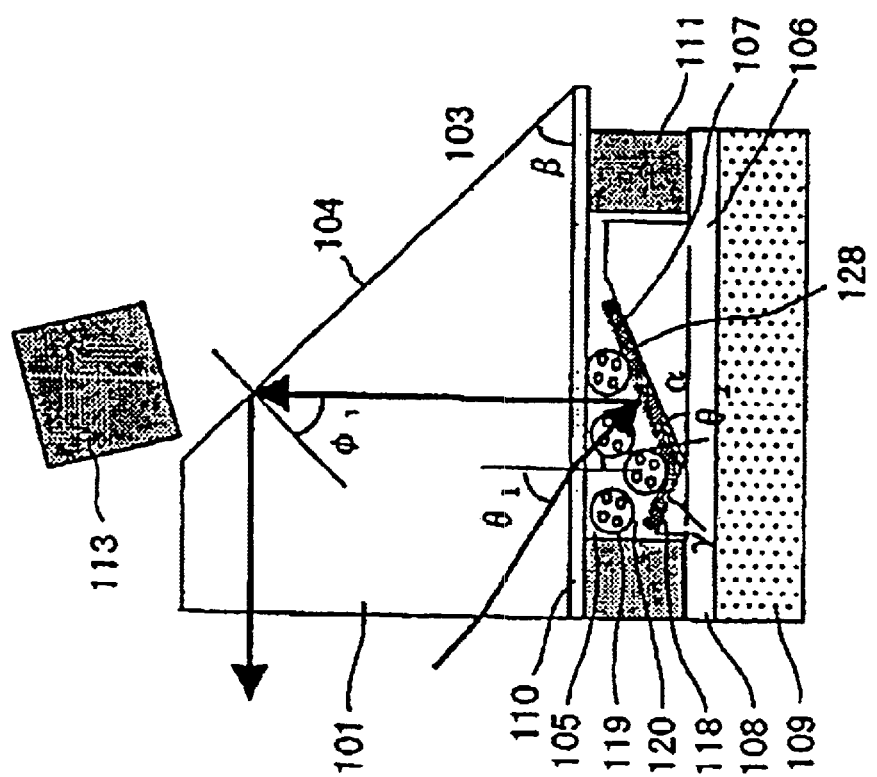
FIGS. 13A and 13B show the ninth embodiment according to the invention.
Figure 13B:
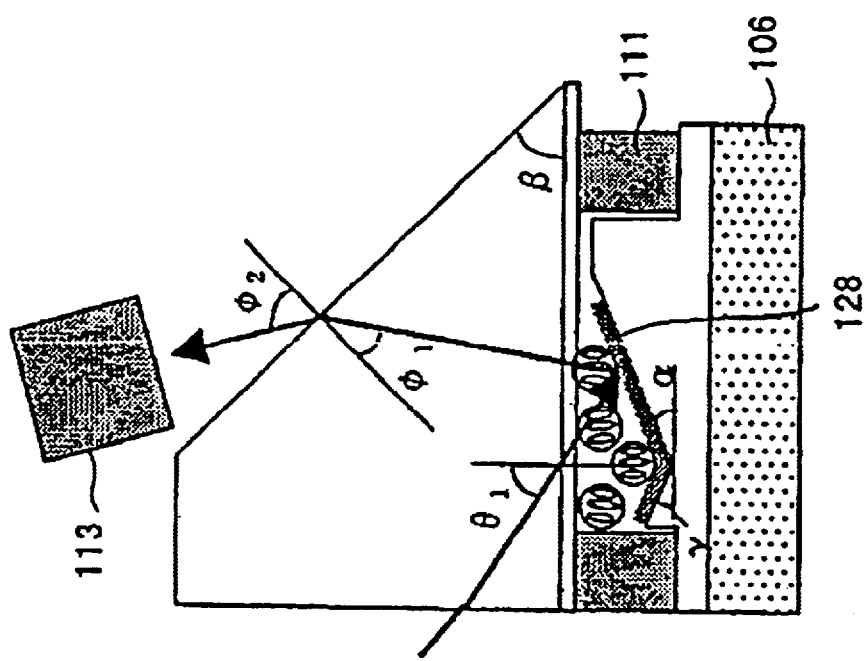

FIGS. 13A and 13B show the ninth preferred embodiment according to the invention. Except that all of the liquid crystal molecules in the droplet are aligned with one direction substantially when no voltage is applied, the structure of the ninth embodiment is the same as that of the eighth embodiment. This alignment is substantially perpendicular to an aligned direction when the electric field is applied (the direction of the electric field, in FIG. 13B). The alignment direction can be horizontal and perpendicular to the drawing with respect to the surface 103. Thereby, because a large difference of index of refraction can be obtained, the variation of the angle $\theta_2$ becomes larger and thereby a large S/N ratio can be obtained. For example, if the polymer dispersed liquid crystal uses the material recipe that is the same as those used in the eighth embodiment, as shown in FIG. 13A, the index of refraction of the polymer dispersed liquid crystal layer can be an average in volume (≈1.61) of the index of refraction (≈ne=1.717) of the liquid crystal and the index of refraction (≈1.56) of the polymer matrix. Similar to the eighth embodiment, assuming the incident angle is 75°, the refraction angle becomes 66°. If the tilt angle α is set to 33°, the reflected light by the reflection surface 128 is almost perpendicularly incident to the incident surface 103. If the tilt angle β is set to 43°, the reflected light is then incident to the light outgoing surface 104 with an incident angle $\phi_1$=43°. At this time, because the equation (2) is satisfied, the reflected light is totally reflected at the light outgoing surface 104 and then emitted from the incident surface 102.

In FIG. 13B, the liquid molecules align with the direction of the electric field and the index of refraction of the polymer dispersed liquid crystal with respect to the S polarization light can be an average in volume (≈1.54) of the index of refraction of the liquid crystal (≈1.53) and the index of refraction of the polymer matrix (≈1.56). At this time, the refraction angle becomes 72°, and the reflected light is incident to the light outgoing surface 104 with an incident angle $\phi_1$=37° and then is refracted with a refraction angle $\phi_2$=66°. The difference of the emitting angles is 180°-(43°+66°)=71°, which is larger than the difference of the emitting angles described in the eighth embodiment.

In FIG. 13A, when the incident angle is set to 60°, the refraction angle becomes 55°. In FIG. 13B, if the tilt angles α and β are respectively set to 27.5° and 43°, then the angle incident angle $\phi_1$ is 39° and the refraction angle $\phi_2$ is 73°. In comparison with an incident angle $\phi_1$=75°, the difference of the emitting angles becomes smaller, but is sufficient in practice. Especially, when a two-dimensional spatial light modulator and an image display apparatus is used, a smaller incident angle (preferably, smaller than 60°) is better since the illuminating optical system can be easily designed.

In addition to the use of the alignment layer as described above, the method for previously aligning the liquid molecules in a predetermined direction can be as follows. When the polymer matrix is polymerized, the liquid molecules can be aligned in one direction by applying an electric field. At this time, the pre-polymer in contact with the liquid crystal is aligned to the same direction as the alignment direction of the liquid crystal. When the pre-polymer is polymerized, the interface with the liquid crystal is fixed as the alignment of the liquid crystal. The interface has a function, to serve as an alignment layer for the liquid molecules. Therefore, after the polymer matrix material is set, even if the electric field is turned off, the liquid crystal can be aligned with the direction of the electric field during polymerization.

Tenth Embodiment

Figure 14A:
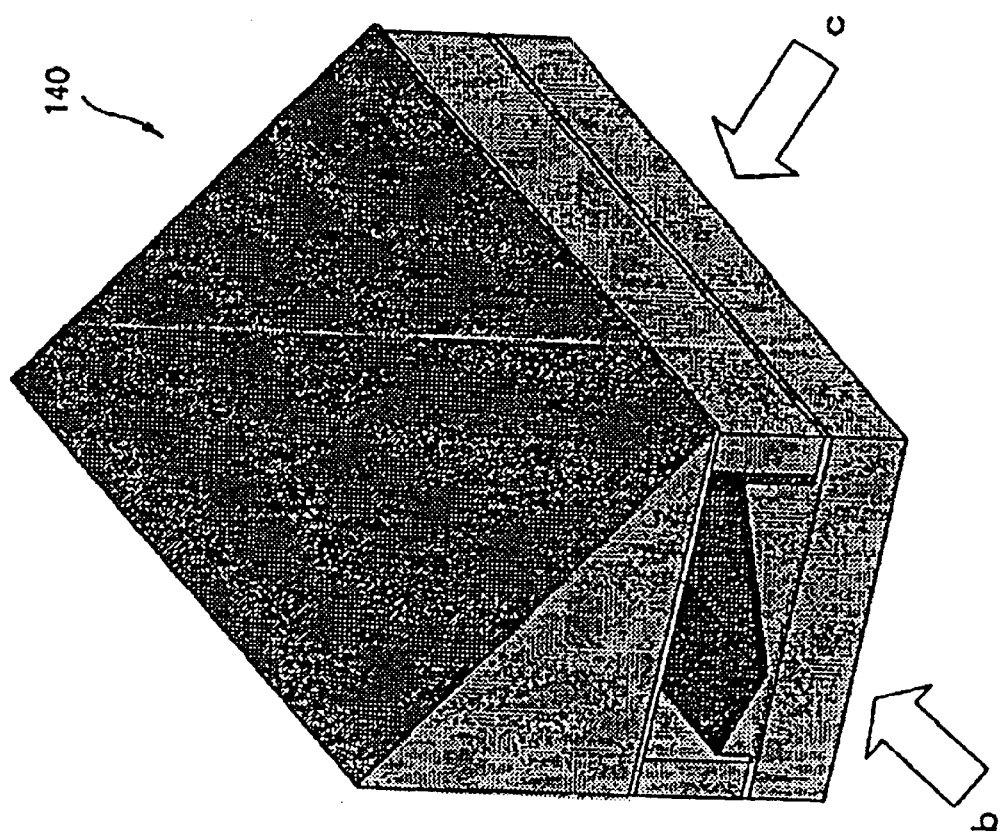
FIGS. 14A, 14B and 14C show the tenth embodiment according to the invention.
Figure 14C:
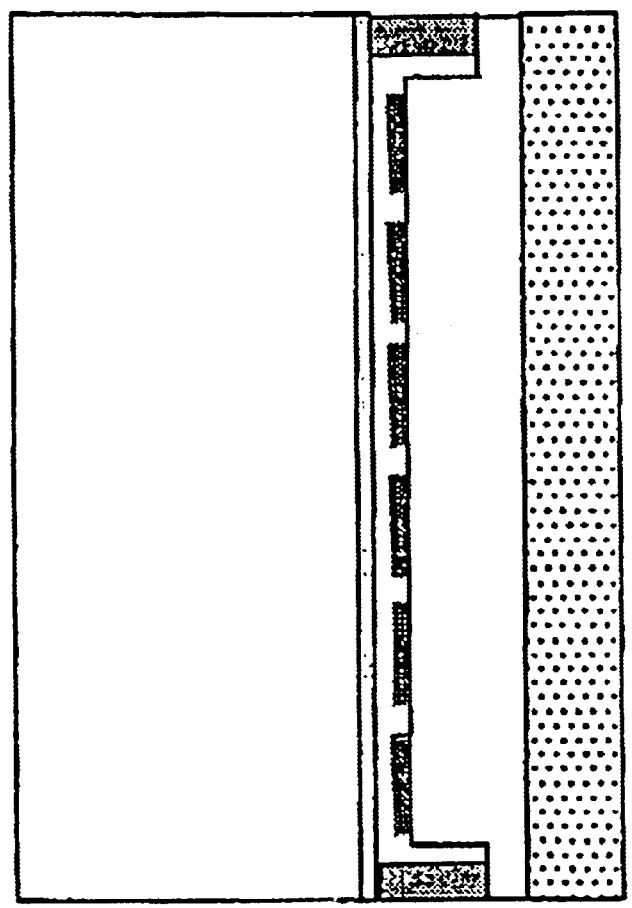
Figure 14B:
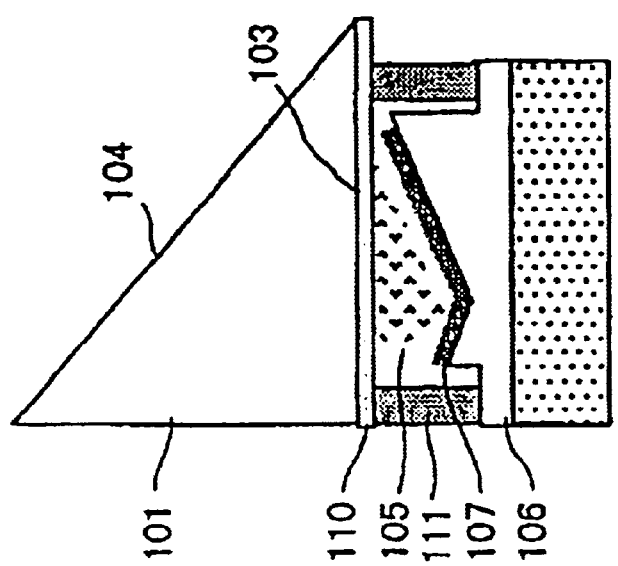

FIGS. 14A, 14B and 14C show the tenth preferred embodiment according to the invention, wherein FIG. 14A shows a perspective view of a one-dimensional spatial light modulator 140, FIG. 14B shows a cross-sectional view of the modulator 140 in the "b" direction, and FIG. 14C shows a cross-sectional view of the modulator 140 in the "c" direction. The tenth embodiment has the same structure as the sixth embodiment basically, except that the metal films 107 (which also serve as the electrodes respectively) are arranged in a one-dimensional array. The reflection substrate 106 is connected to the electrodes 107 respectively and driving elements can be preferably formed on the substrate 106 for selectively providing signals to those electrodes 107. By selectively applying voltages to the electrodes that are arranged in a one-dimensional array, only the reflected light reflected by the selected electrodes (the metal films) 107 are emitted from the light outgoing surface 104. Therefore, a light with a line shape can be ON/OFF (spatial optical modulation). Furthermore, a two-dimensional spatial optical modulation can be achieved by further combining a scanning device 137 that scans along a direction perpendicular to the arrangement of the electrodes 107.

Figure 15:
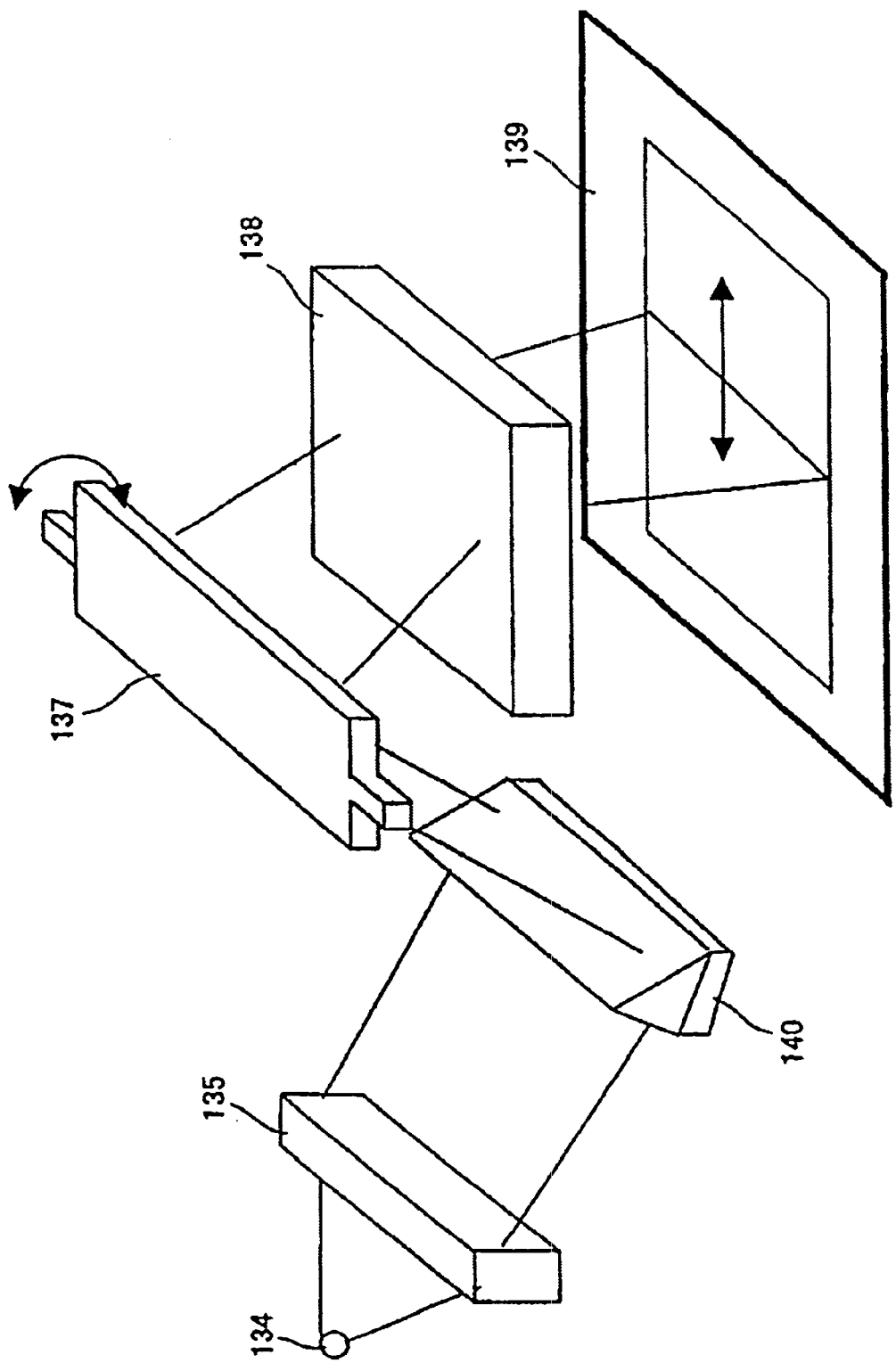
FIG. 15 shows the tenth embodiment according to the invention.

As shown in FIG. 15, the driving signals provided to the electrodes (the metal films) 107 of the spatial light modulator 140 and the driving of the scanning device 137 consisting of a galvanic mirror etc. are controlled based upon image signals. By projecting the light obtained by the two-dimensional spatial optical modulation to a screen 139 through a projecting lens 138, an image display apparatus can be constructed. In FIG. 15, the light source 134 can be a laser source, a LED or a lamp etc. Additionally, a collimator 135 can be used as an optical integrator and a polarization converting system (not shown) can be also arranged in the post stage of the collimator 135 or the optical integrator.

Eleventh Embodiment

Figure 16:
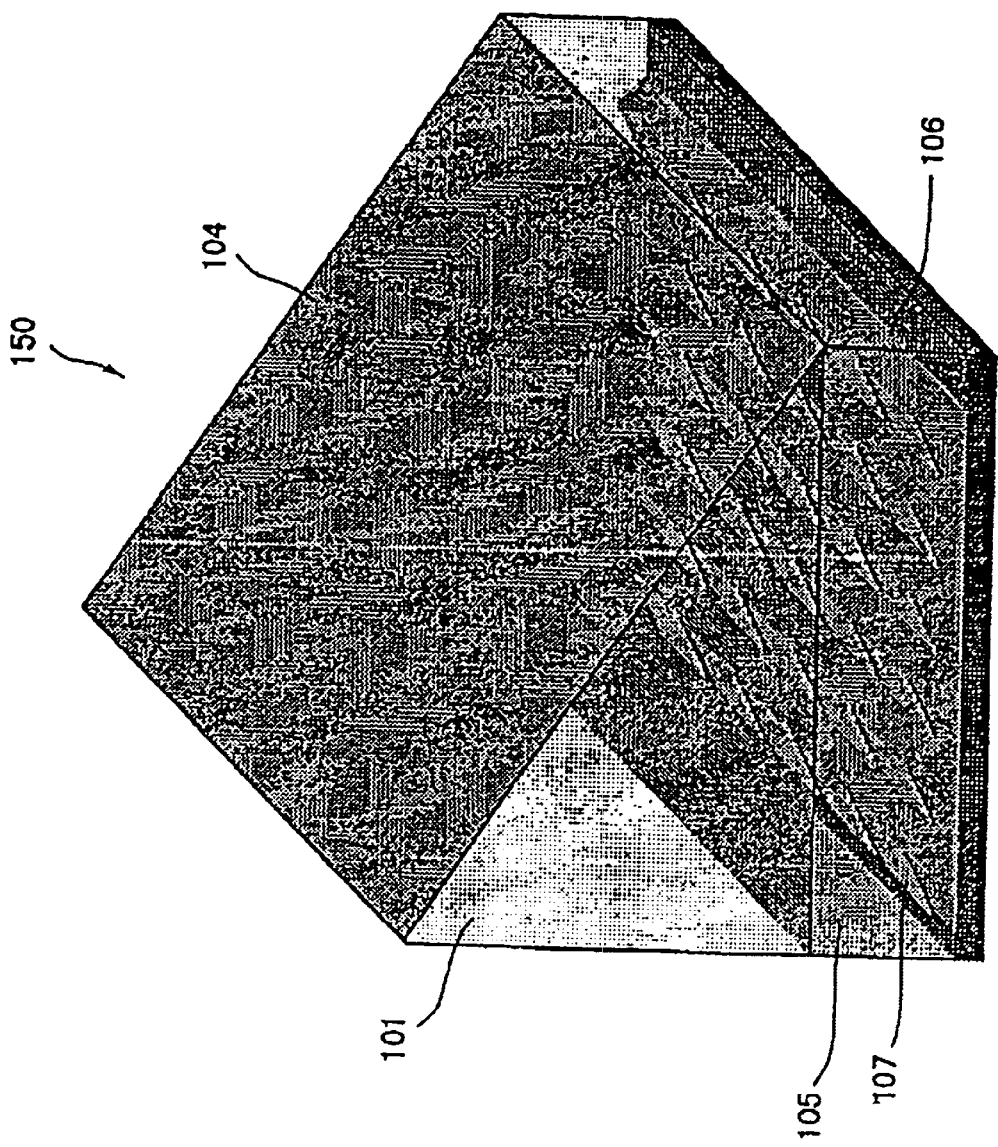
FIG. 16 shows the eleventh embodiment according to the invention.

FIG. 16 shows the eleventh preferred embodiment according to the invention, which is a perspective view of a two-dimensional spatial light modulator 150. The basic structure of the eleventh embodiment is the same as that of the tenth embodiment, except that the metal films 107 (which also serve as the electrodes respectively) are arranged in a two-dimensional array. The reflection substrate 106 is connected to the electrodes 107 respectively and driving elements can be preferably formed on the substrate 106 for selectively providing signals to those electrodes 107. By selectively applying voltages to the electrodes that are arranged in a two-dimensional array, only the reflected light by the selected electrodes (the metal films) 107 is emitted from the light outgoing surface 104. Therefore, a light with a plane shape can be ON/OFF (spatial optical modulation).

In this situation, because the spatial optical modulation can be performed in a two-dimensional manner by only using the two-dimensional spatial light modulator, the scanning device in FIG. 15 is not required in the eleventh embodiment. An image display apparatus can be constructed by setting a projecting lens outside the light outgoing surface 104 for projecting light to a screen.

Additionally, although the light transmitting element 101 in FIGS. 14A, 14B, 16A and 16B is common in use, the light transmitting element 101 can be also divided corresponding to each optical switching element. Regarding the image display apparatus that uses the one-dimensional or two-dimensional spatial light modulator above, a plurality of incident lights with different wavelengths, such as the red, the green, and the blue lights, is used. The image of each color can be displayed in a time-division manner (field sequential), or the image of each color can be displayed simultaneously by installing a plurality of spatial light modulators such that a full color image can be displayed.

EXAMPLE 1

FIGS. 17A to 17D schematically shows a manufacturing process for making the two-dimensional spatial light modulator. The manufacturing detail for the two-dimensional spatial light modulator is described as follows.

Figure 17B:
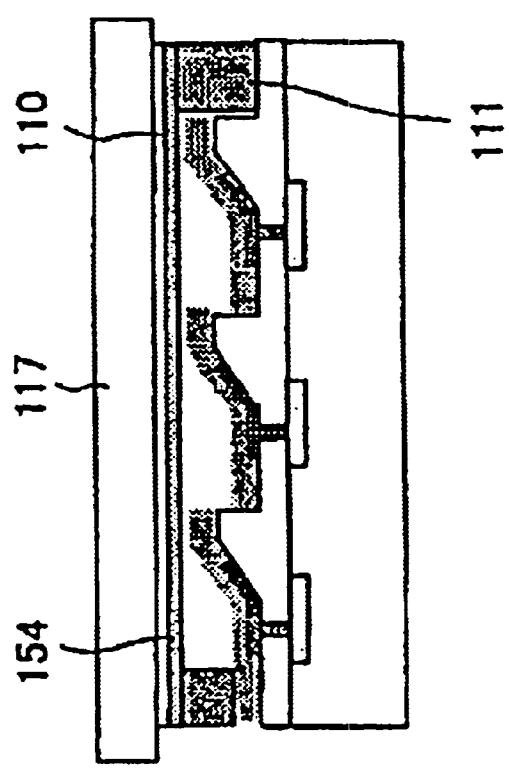
FIGS. 17A–17D show a manufacturing process for making a two-dimensional spatial light modulator.
Figure 17A:
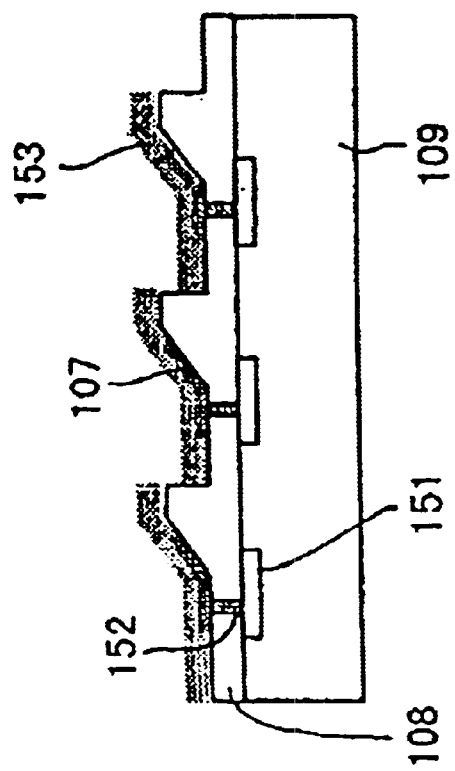

FIG. 17A shows the making of a reflection substrate. A plurality of driving elements 151 composed of MOSFET is formed on the surface of a silicon substrate 109, and a silicon oxide layer 108 with a thickness of 5 $\mu$m is formed on the silicon substrate 109 by a CVD (chemical vapor deposition) process. Tilt surfaces and contact holes 152 are formed by patterning and etching the silicon oxide 108 using a photomask having an area gradation pattern formed thereon. After the openings 152 are filled with metal by the CVD process, an aluminum layer with a thickness of 0.1 $\mu$m is formed by sputtering over the tilt surfaces and then pattering, to serve as the electrodes 107 and reflection films 107 respectively. Furthermore, a polyimide layer with a thickness of 0.1 $\mu$m is formed by spin coating over the reflection films (the electrodes) 107, on which a rubbing process is performed to form alignment layers 153.

FIG. 17B shows the making of cells. A light transmitting composed of crown glass (BK7) is provided. As shown in FIG. 17B, a transparent electrode 110 that is composed of an ITO material and has a thickness of 50 nm, and an alignment layer 154 composed of polyimide are then formed on one surface of the light transmitting element 117. Thereafter, the formed structure is attached onto the reflection substrate shown in FIG. 17A by a sealing material 111 made of epoxy resin, etc., by which "empty" cells are formed. In addition, a filling opening is formed on a portion of the sealing material 111.

Figure 17D:
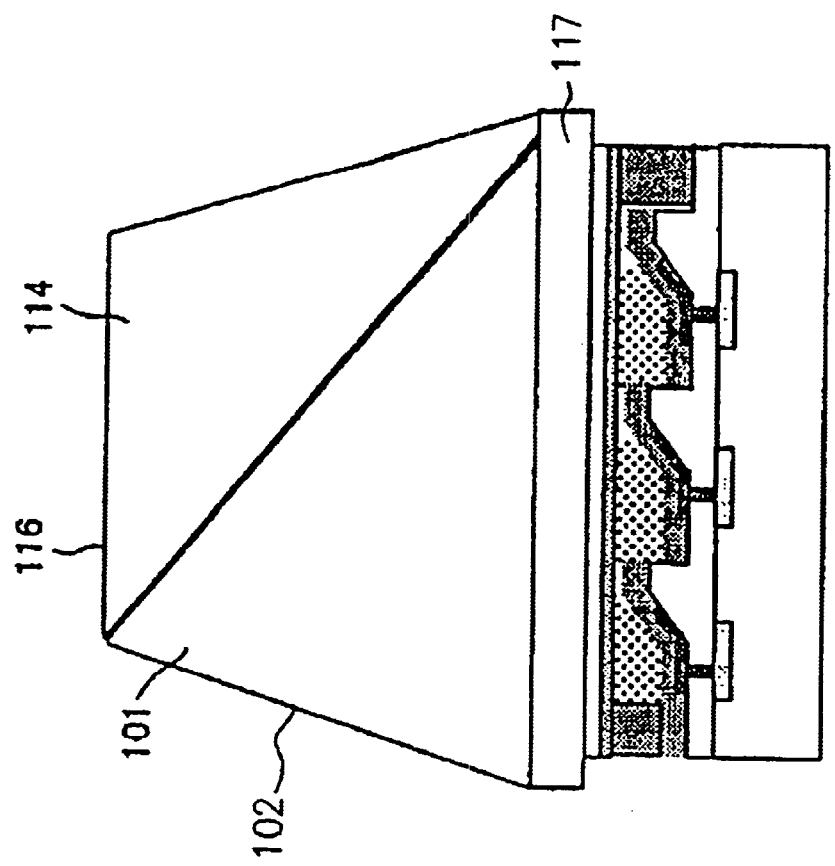
Figure 17C:
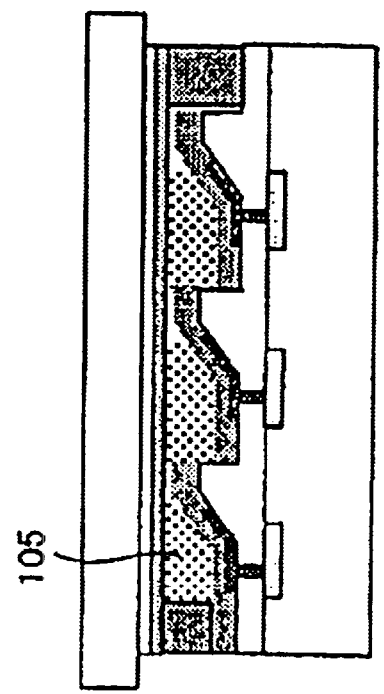

FIG. 17C shows the filling of liquid crystal. After the "empty" cells in FIG. 17B are vacuumed, a liquid crystal 105, such as E7, is filled into the "empty" cells through the filling opening. The filling opening is then sealed.

FIG. 17D shows the attachment of the light transmitting elements. On the light transmitting element (for example a plate shape) 117, a photo setting adhesive is coated, and then light transmitting elements 101, 114 are attached on the light transmitting element 117.

Using the spatial light modulator made above, an image display can be performed as in the following description. A laser beam, which is shaped to an almost rectangular cross section and has a wavelength of 670 nm, uses an S polarization light and is incident to the incident surface 102.

Voltages, such as 5V, are respectively applied by the driving elements 151 to selected electrodes 107 corresponding to an image data, and an optical output that is spatially modulated is emitted from the light outgoing surface 116. Accordingly, an enlarged image (binary image) can be displayed on a screen by a projecting lens (not shown).

EXAMPLE 2

FIGS. 18A to 18E schematically show a manufacturing process for making the two-dimensional spatial light modulator. The manufacturing detail for the two-dimensional spatial light modulator is described as follows.

Figure 18A:
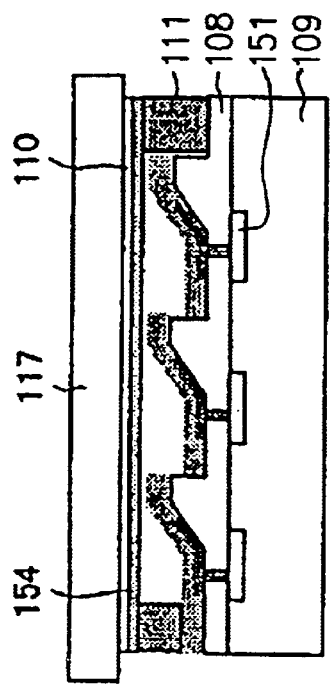
FIGS. 18A–18E show another manufacturing process for making a two-dimensional spatial light modulator.

FIG. 18A shows the making of a reflection substrate. A plurality of driving elements 151 composed of MOSFET are formed on the surface of a silicon substrate 109, and a silicon oxide layer 108 with a thickness of 5 µm is formed on the silicon substrate 109 by a CVD (chemical vapor deposition) process. Tilt surfaces and contact holes 152 are formed by patterning and etching the silicon oxide 108 using a photomask having an area gradation pattern formed thereon. After the openings 152 are filled with metal by the CVD process, an aluminum layer with a thickness of 0.1 µm is formed by sputtering over the tilt surfaces and then patterning, to serve as the electrodes 107 and reflection films 107 respectively. Furthermore, a polyimide layer with a thickness of 0.1 µm is formed by spin coating over the reflection films (the electrodes) 107, on which a rubbing process is performed to form alignment layers 153.

Figure 18B:
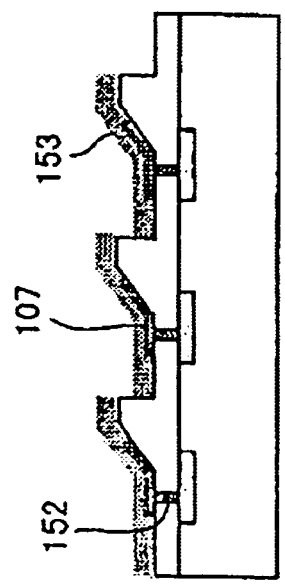

FIG. 18B shows the making of cells. A light transmitting element 117 composed of crown glass (BK7) is provided. As shown in FIG. 18B, a transparent electrode 110 that is composed of an ITO material and has a thickness of 50 nm, and an alignment layer 154 composed of polyimide are then formed on one surface of the light transmitting element 117. Thereafter, the formed structure is attached onto the reflection substrate shown in FIG. 18A by a sealing material 111 made of epoxy resin, etc., by which "empty" cells are formed. In addition, a filling opening is formed on a portion of the sealing material 111.

Figure 18C:
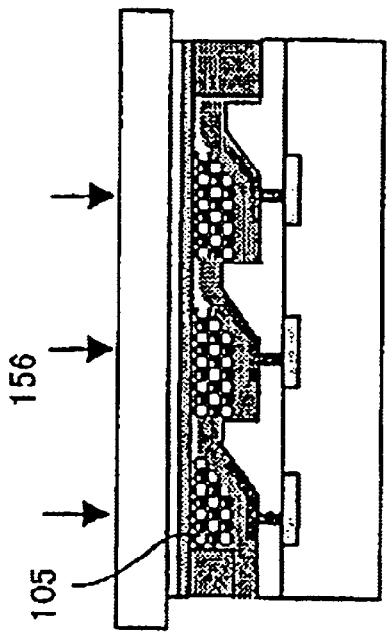

FIG. 18C shows the filling of liquid crystal. After the "empty" cells in FIG. 18B are vacuumed, a mixture of a liquid crystal 105 (such as BL24) and a ultraviolet-ray setting compound (NOA81), in which the liquid crystal concentration is 45 wt %, is filled into the "empty" cells through the filling opening. The filling opening is then sealed.

Figure 18D:
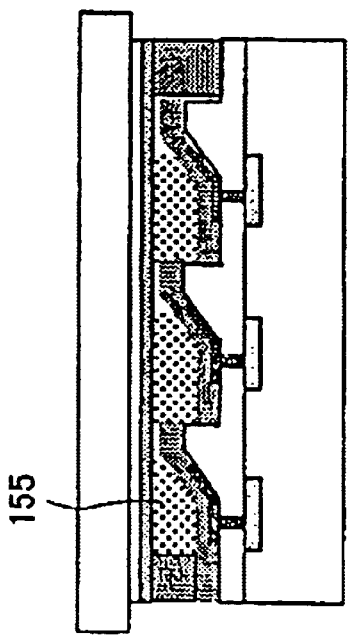

FIG. 18D shows a setting process. A UV light 156 with a power of 400 mW/cm2 illuminates the mixture of the liquid crystal compound using a high-pressure mercury lamp so that a polymer dispersed liquid crystal is formed.

Figure 18E:
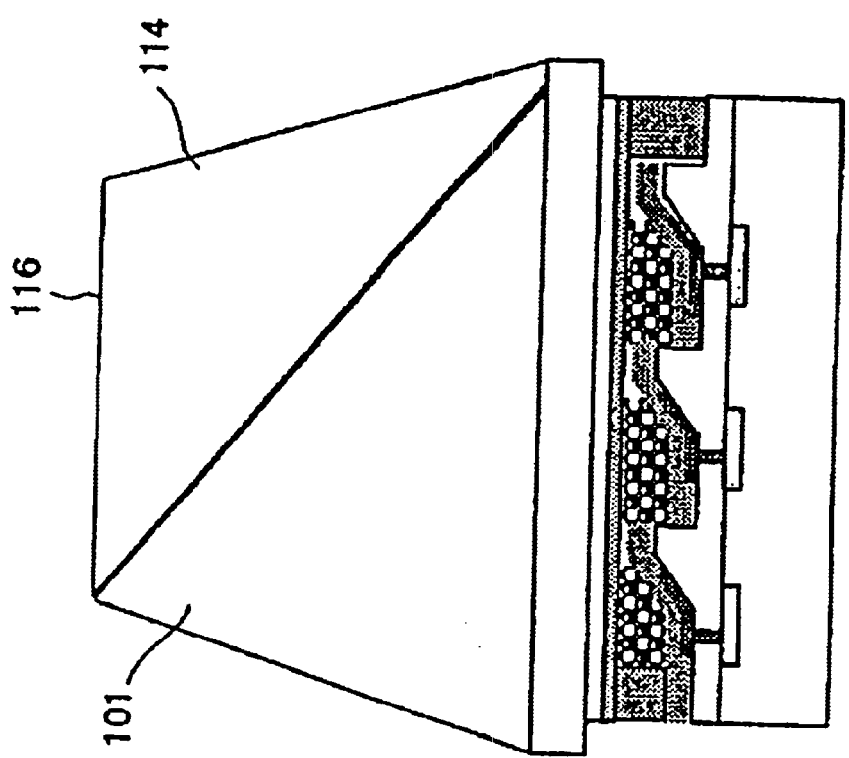
Figure 19:
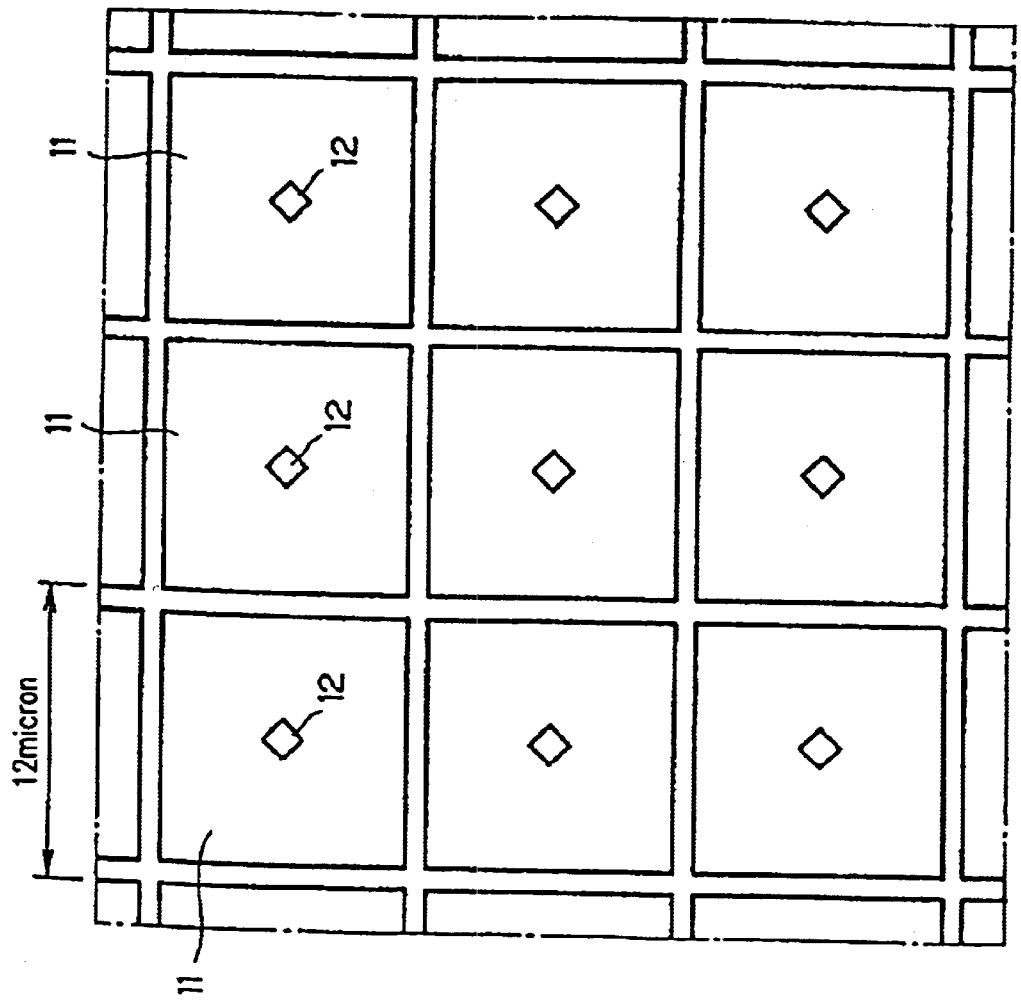
FIG. 19 shows a plane view of a conventional spatial light modulator.
Figure 20A:
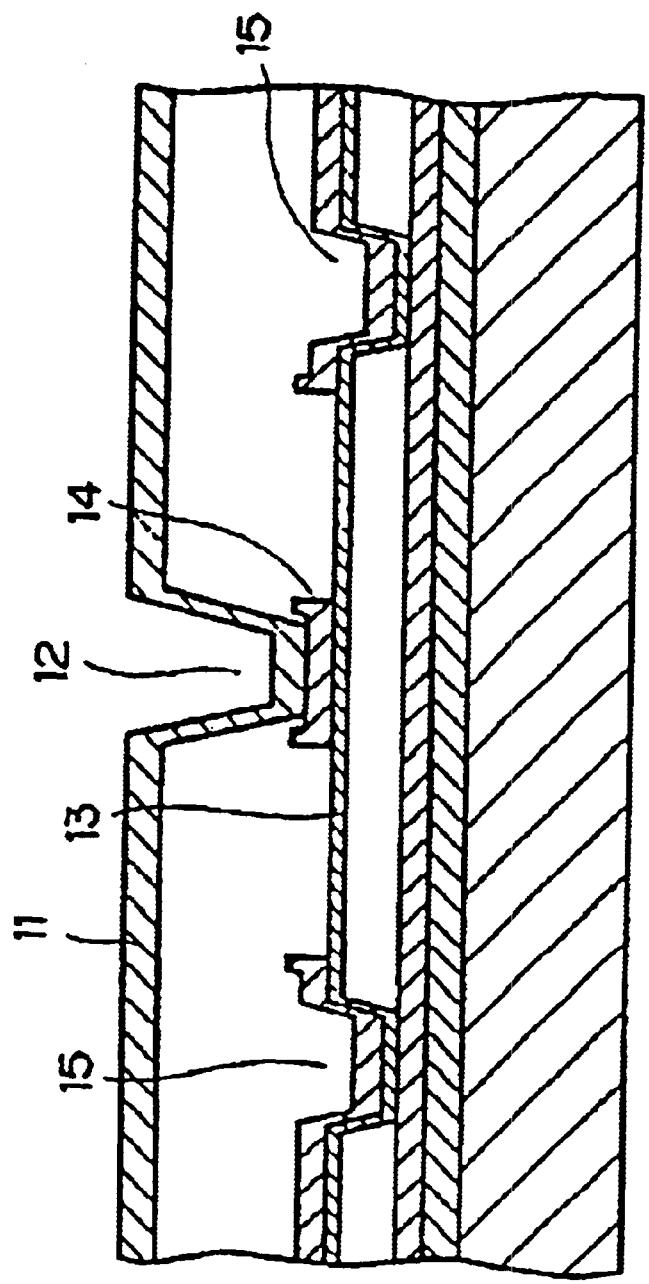
FIGS. 20A and 20B shows a cross-sectional view of one of rotational mirrors of the spatial light modulator in FIG. 19.
Figure 20B:
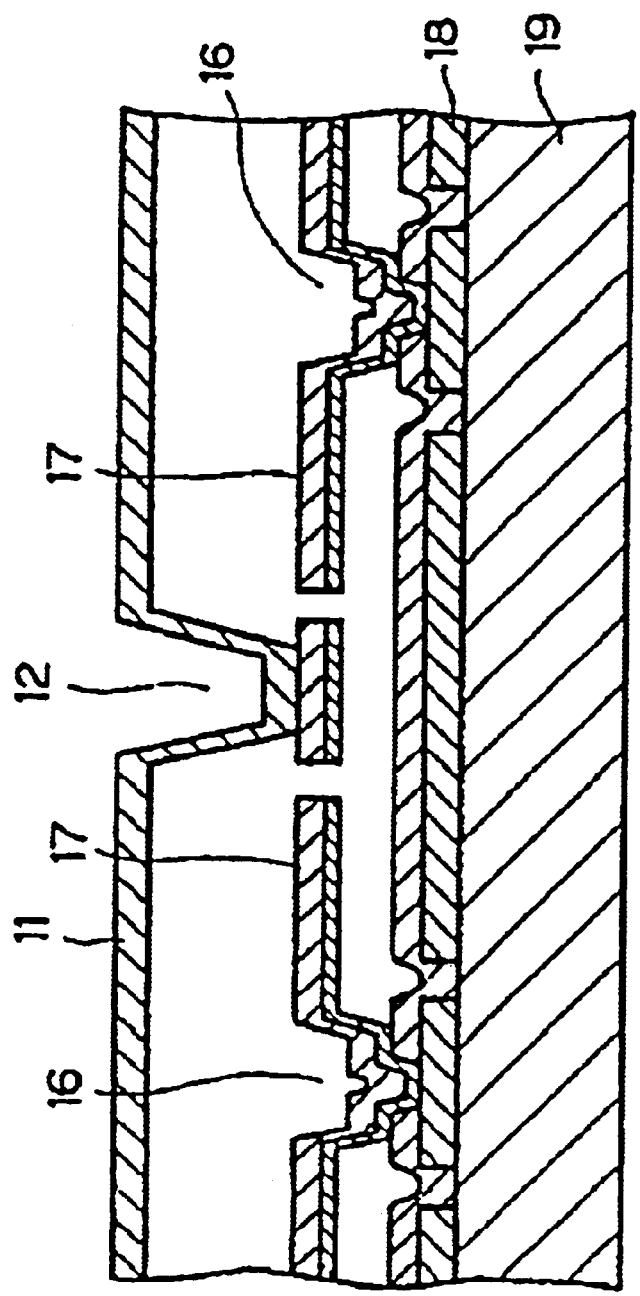
Figure 21:
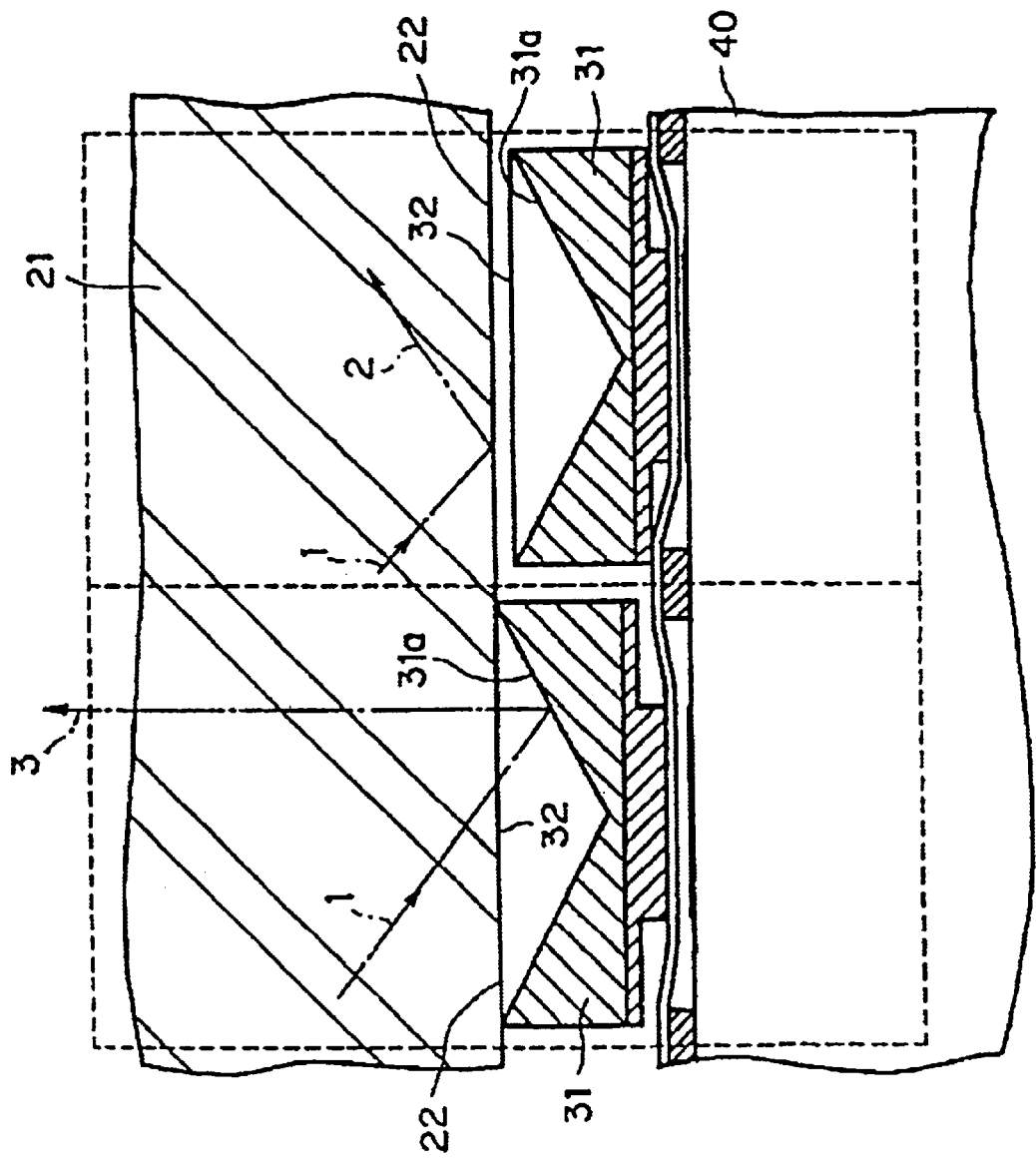
FIG. 21 shows the operation for the conventional optical switching element.
Figure 22:
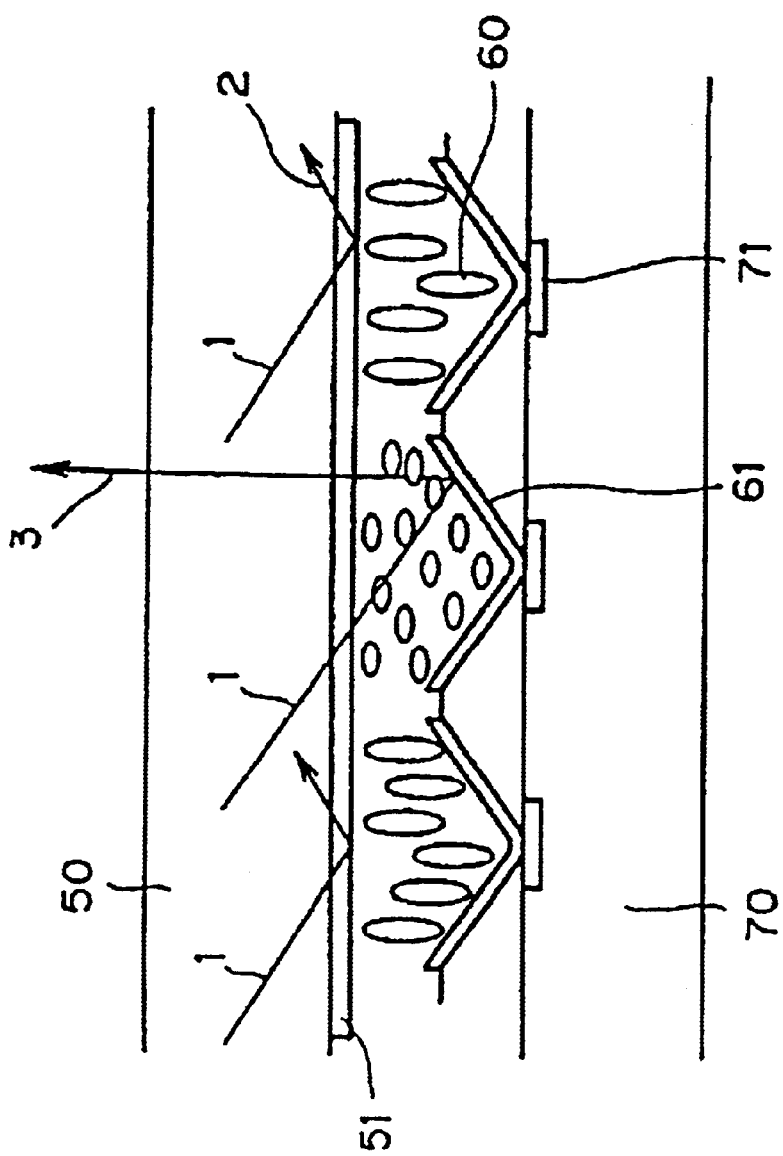
FIG. 22 shows a conventional structure of the optical switching element.

FIG. 18E shows the attachment of the light transmitting elements. On the light transmitting element (for example a plate shape) 117, a photo setting adhesive is coated, and then light transmitting elements 101, 114 are attached on the light transmitting element 117.

Using the spatial light modulator made above, an image display can be performed as in the following description. A laser beam, which is shaped to an almost rectangular cross section and has a wavelength of 670 nm, uses an S polarization light and is incident to the incident surface 102. Voltages, such as 15V, are respectively applied by the driving elements 151 to selected electrodes 107 corresponding to an image data, and an optical output that is spatially modulated is emitted from the light outgoing surface 116. Accordingly, an enlarged image (64 scales) can be displayed on a screen by a projecting lens (not shown).

According to the optical switching element of the invention, an index variable material is sandwiched between the first light transmitting element and the reflection substrate having a tilt surface, and by varying the index of refraction of the index variable material, an angle formed by the reflected light and a normal line of the light outgoing surface is changed such that an emitting direction of the reflected light is changed. Thereby, the structure becomes simple, the durability is higher, the cost can be reduced and the light utility rate can be increased.

According to the optical switching element of the invention, because the second light incident surface is in contact with index variable material and the light outgoing surface of the first light transmitting element is not in parallel, the S/N ratio can be increased.

According to the optical switching element of the invention, because the optical switching element is switched between a first state and a second state, wherein the first state satisfies sin $\phi_1 \geq n_a/n_1$, and the second state satisfies sin $\phi_1 < n_a/n_1$, in which $n_1$ is the index of refraction of the first light transmitting element, $n_a$ is an index of refraction of a material surrounding the first light transmitting element, and $\phi_1$ is the angle formed by the reflected light and a normal line of the light outgoing surface, and therefore the S/N ratio can be further increased.

According to the optical switching element of the invention, because a second light transmitting element at least has a light incident surface that is substantially parallel and opposite to the light outgoing surface of the first light transmitting element with a predetermined distance; and a light outgoing surface that is not parallel to the light incident surface of the second light transmitting element, the S/N ratio can be higher.

According to the optical switching element of the invention, because a light transmitting plate that is optically in contact with the second light incident surface of the first light transmitting element and has an index of refraction substantially the same as that of the first light transmitting element, the manufacturing process can be simplified.

According to the optical switching element of the invention, because the reflection substrate further comprises a second reflection surface having a tilt angle less than $90°-\theta_{2max}$ tilted from the reflection substrate and a common edge shared with the first tilt surface, which angle $\theta_{2max}$ is defined as a maximum of an angle formed between a normal line of the second light incident surface and an incident light that enters the index variable material from the second light incident surface of the first light transmitting element, therefore the driving energy can be further reduced.

According to the optical switching element of the invention, because a plurality of reflection surfaces is formed on the reflection substrate, wherein reflection surfaces correspond respectively to driving elements used for applying external signals to the index variable material, the driving energy can be further reduced.

According to the optical switching element of the invention, because the index variable material comprises a liquid crystal, the manufacturing process becomes easy and the S/N ratio becomes higher.

According to the invention, because the index variable material comprises a compound (polymer dispersed liquid crystal) of a polymer and a liquid crystal, and that the liquid crystal is dispersed in a polymer matrix, it can provide an optical switching element with a high response speed.

According to the optical switching elements of invention, because the index variable material is composed of the poly dispersion liquid crystal and the liquid crystal is a droplet having a grain size below one-fifth wavelength of the incident light, the optical loss can be reduced.

According to the optical switching elements of invention, because the index variable material is composed of the poly dispersion liquid crystal and all of the liquid crystal molecules are substantially aligned in one direction when no voltage is applied, the S/N ration can become higher.

According to the spatial light modulator of the invention, because it comprises a plurality of the optical switching elements above and the optical switching elements are arranged in a two-dimensional array, the structure becomes simple, the durability is higher, the cost can be reduced and the light utility rate can be increased.

According to the spatial light modulator of the invention, because it comprises a plurality of the optical switching elements above and the optical switching elements are arranged in a one-dimensional array, the yield rate can be increased and the device cost can be reduced.

According to the invention, it can provide an image display apparatus with a high durability and a high light utility rate because the image formed by the spatial light modulator is projected to a screen.

According to the invention, it can provide a low-cost image display apparatus because the light emitted from spatial light modulator is perpendicularly scanned and then projected to a screen such that a two-dimensional image is obtained.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. An optical path element, comprising:
   a light incident unit such that an incident light is incident through a light transmitting element;
   a light reflection unit for reflecting the incident light from the light incident unit;
   a light emitting unit for emitting a reflection light reflected by the light reflection unit out of the light transmitting element;
   an index variable material filled into an optical path in the light reflection unit; and
   a signal input device for providing a signal to the index variable material according to information to alter an index of refraction of the index variable material;
   wherein the index of refraction of the index variable material is varied to a range such that the incident light is not totally reflected at an interface between the light transmitting element and the index variable material.

2. The optical path element of claim 1, wherein the light incident unit and the light emitting unit are surfaces respectively, wherein both surfaces are not in parallel.

3. The optical path element of claim 1, wherein the optical switching element is switched between a first state and a second state, wherein the first state is that the total reflection occurs at the interface between the light transmitting element and an external material surrounding the light transmitting element, and the second state is that no total reflection occurs.

4. The optical path element of claim 1, further comprising a second light transmitting element that the incident light is emitted through the second light transmitting element.

5. The optical path element of claim 1, further comprising a light transmitting plate that is optically in contact with the light incident unit of the light transmitting element and has an index of refraction substantially the same as that of the light transmitting element.

6. The optical path element of claim 1, wherein the light reflection unit comprises two surfaces with a shared common edge, an angle formed between a normal line of one of the surfaces of the light reflection unit and a normal line of the surface forming the light incident unit is less than $90°-\theta_{2max}$, wherein the angle $\theta_{2max}$ is defined as a maximum of an angle formed between the normal line of the surface forming the light incident unit and the incident light that enters the index variable material.

7. The optical path element of claim 1, wherein a plurality of reflection surfaces is formed on the reflection unit, wherein reflection surfaces correspond respectively to elements used for applying external signals to the index variable material.

8. The optical path element of claim 1, wherein the index variable material comprises a liquid crystal.

9. The optical path element of claim 8, wherein all liquid crystal molecules are substantially aligned in one direction when no voltage is applied.

10. The optical path element of claim 1, wherein the index variable material comprises a compound of a polymer and a liquid crystal such that the liquid crystal is dispersed in a polymer matrix.

11. The optical path element of claim 10, wherein the liquid crystal is a droplet having a grain size below one-fifth wavelength of the incident light.

12. A spatial light modulator, comprising a plurality of the optical path elements in any one of claims 1 to 9, wherein the optical switching elements are arranged in a two-dimensional array.

13. An image display apparatus, comprising:
   a spatial light modulator in claim 12;
   a device such that a light is incident to the spatial light modulator; and
   a displaying device for projecting an image formed by the spatial light modulator to a screen.

14. A spatial light modulator, comprising a plurality of the optical path elements in any one of claims 1 to 9, wherein the optical path elements are arranged in a one-dimensional array.

15. An image display apparatus, comprising:
   a spatial light modulator in claim 14;
   a device such that a light is incident to the spatial light modulator;
   a scanning device for scanning a light emitted from spatial light modulator in a direction perpendicular to a line direction of the optical path elements of the spatial light modulator; and
   a displaying device for projecting an image formed by the spatial light modulator to a screen.

* * * * *